US011397406B2

(12) United States Patent
Leister et al.

(10) Patent No.: US 11,397,406 B2
(45) Date of Patent: Jul. 26, 2022

(54) METHOD FOR PRODUCING HOLOGRAMS

(71) Applicant: SEEREAL TECHNOLOGIES S.A., Munsbach (LU)

(72) Inventors: Norbert Leister, Dresden Sachsen (DE); Ralf Haussler, Dresden Sachsen (DE); Gerald Futterer, Metten Bayern (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 256 days.

(21) Appl. No.: 16/301,839

(22) PCT Filed: May 17, 2017

(86) PCT No.: PCT/EP2017/061846
§ 371 (c)(1),
(2) Date: Nov. 15, 2018

(87) PCT Pub. No.: WO2017/198713
PCT Pub. Date: Nov. 23, 2017

(65) Prior Publication Data
US 2019/0121291 A1   Apr. 25, 2019

(30) Foreign Application Priority Data

May 18, 2016 (EP) .................................. 16170063
Aug. 23, 2016 (EP) .................................. 16185261

(51) Int. Cl.
*G03H 1/08*   (2006.01)
*G03H 1/16*   (2006.01)
*G03H 1/22*   (2006.01)

(52) U.S. Cl.
CPC ............. *G03H 1/0808* (2013.01); *G03H 1/16* (2013.01); *G03H 1/2202* (2013.01);
(Continued)

(58) Field of Classification Search
CPC ...... G03H 1/0808; G03H 1/2202; G03H 1/16; G03H 1/2294; G03H 2001/0825;
(Continued)

(56) References Cited

U.S. PATENT DOCUMENTS

2006/0055994 A1* 3/2006 Schwerdtner ............ G03H 1/08
359/15
2006/0139711 A1* 6/2006 Leister ..................... G03H 1/32
359/9
(Continued)

FOREIGN PATENT DOCUMENTS

EP   2 138 911 A2   12/2009
WO  2009/112468 A2   9/2009

OTHER PUBLICATIONS

Yancao Zhang et al., "Improving the reconstruction quality with extension and apodization of the digital hologram," Applied Optics, Optical Society of America, Washington, DC; US; Bd. 48, Nr. 16 (Jun. 1, 2009), pp. 3070-3074 XP001524413.
(Continued)

*Primary Examiner* — Jade R Chwasz
(74) *Attorney, Agent, or Firm* — Saul Ewing Arnstein & Lehr LLP

(57) ABSTRACT

The invention relates to a method for generating holograms for encoding in a spatial light modulation device for a holographic display for representing a two- and/or three-dimensional scene. The two- and/or three-dimensional scene is decomposed into object points and encoded in a hologram, which is subdivided into subholograms, in the spatial light modulation device. The object points of the scene are encoded into encoding regions on the spatial light modulation device. A size and/or shape of the encoding region is selected in relation to a size and/or shape of a subhologram, assigned to the encoding region, in such a way that crosstalk
(Continued)

of higher diffraction orders in a virtual visibility region is reduced.

27 Claims, 14 Drawing Sheets

(52) U.S. Cl.
CPC ... *G03H 1/2294* (2013.01); *G03H 2001/0825* (2013.01); *G03H 2001/0833* (2013.01); *G03H 2001/2236* (2013.01); *G03H 2001/2239* (2013.01); *G03H 2001/2255* (2013.01); *G03H 2210/452* (2013.01); *G03H 2210/454* (2013.01); *G03H 2210/46* (2013.01)

(58) Field of Classification Search
CPC ... G03H 2001/2255; G03H 2001/2236; G03H 2001/2239; G03H 2001/0833; G03H 2210/452; G03H 2210/46; G03H 1/0005; G03H 2001/0224; G03H 1/0866; G03H 1/0841; G03H 1/08; G03H 2210/454; G03H 2240/61; G03H 2225/22; G03H 1/0891; G03H 1/30; G03H 1/32; G03H 2225/12
USPC .......................................................... 359/9
See application file for complete search history.

(56) References Cited

U.S. PATENT DOCUMENTS

| 2010/0073744 | A1* | 3/2010 | Zschau | ................ | G03H 1/0808 |
| | | | | | 359/9 |
| 2011/0019249 | A1 | 1/2011 | Leister | | |
| 2011/0096381 | A1* | 4/2011 | Leister | ................ | G03H 1/2294 |
| | | | | | 359/9 |

OTHER PUBLICATIONS

Yancao Zhang et al., "Optimization of the window function for digital hologram apodization in reconstructing the holographic image," Journal of Optics, Institute of Physics Publishing, Briston, GB; Bd. 15, Nr. 10 (Sep. 19, 2013) p. 105406 XP020251880.

Gilles Antonin et al., "Complex modulation computer-generated hologram by a fast hybrid point-source/wave-field approach," 2015 IEEE International Conference on Image Processing (ICIP), IEEE (Sep. 27, 2015), pp. 4962-4966 XP032827373.

International Search Report, dated Dec. 5, 2017, and Written Opinion issued in International Application No. PCT/EP2017/061846.

* cited by examiner

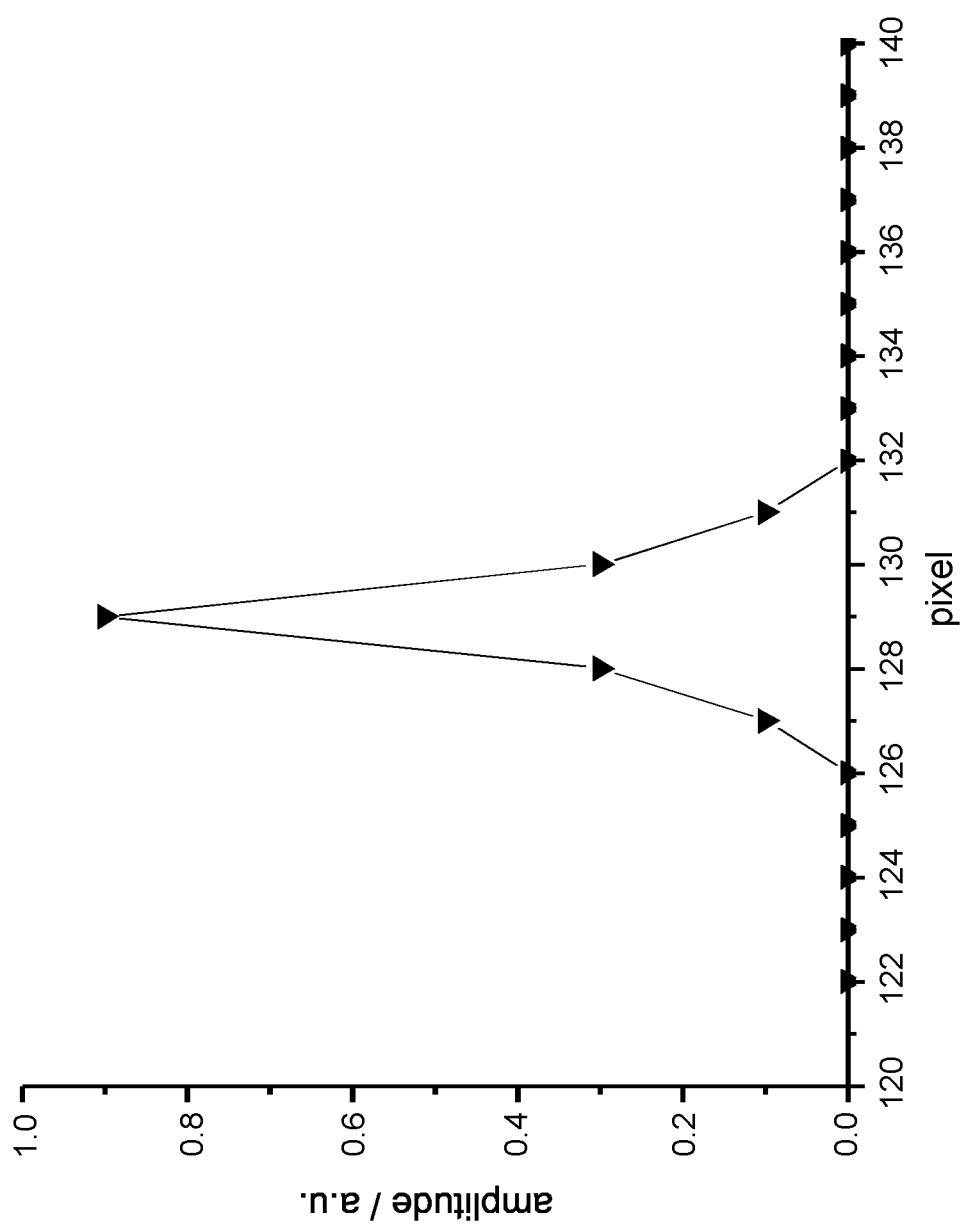

METHOD FOR PRODUCING HOLOGRAMS

CROSS REFERENCE TO RELATED APPLICATIONS

This application claims the priority of PCT/EP2017/061846, filed on May 17, 2017, which claims priority to European Application No. EP 16170063.8, filed on May 18, 2016; and European Application No. EP 16185261.1, filed on Aug. 23, 2016, the entire contents of each of which are incorporated fully herein by reference.

BACKGROUND OF THE INVENTION

The invention relates to a method for generating holograms for encoding in a spatial light modulation device for a holographic display for representing a two- and/or three-dimensional scene. Furthermore, the invention also relates to a light modulation apparatus into which a hologram is encoded according to the method according to the invention, and to a display, in particular a holographic display.

In comparison with autostereoscopic displays or display devices, holographic displays or display devices represent substantially greater challenges in relation to the resolution of a spatial light modulation device contained in the holographic display and used for encoding a hologram, as well as the computational effort of the hologram.

WO 2006/066919 A1, for example, describes how these requirements can be reduced. It describes, for example, the generation of a virtual observer window, which is provided inside a diffraction order of the Fourier spectrum of the hologram encoded in the spatial light modulation device, and by which an observer can observe a reconstructed, preferably three-dimensional, scene in a reconstruction space, which may extend in front of and/or behind the spatial light modulation device.

With respect to reconstruction of an individual object point, this means that, for any object point of the scene, a subhologram is encoded into the spatial light modulation device. The extent and the position of the subhologram on the spatial light modulation device may, for example, be defined by a projection of the virtual observer window, or of the visibility region, via the object point onto the spatial light modulation device. The total hologram of the preferably three-dimensional scene comprising a multiplicity of object points is in this case represented as a superposition of subholograms of all the object points of the three-dimensional scene. The individual subholograms are in this case not completely superimposed on one another, but rather they are shifted relative to one another according to their object points to be reconstructed so that only a part of their area is superimposed by one or more subholograms.

In other words, the generation of spatial image points in a holographic display may be carried out with the aid of the encoding of object points into subholograms. The encoding may in this case be carried out in an external general computer system or in a control unit built into the holographic display. In this case, it is previously known that the extent of each subhologram in the spatial light modulation device may be fixed, for example only dependent on the depth position of an object point with respect to the spatial light modulation device, or variable according to requirements. It is furthermore known that the geometrical position of the subhologram on the spatial light modulation device and its extent may vary according to the technical requirements, for example the position of the eyes of an observer of the reconstructed scene with respect to the spatial light modulation device, or also the position of a voxel or a pixel inside the scene to be represented. The calculation of the encoding values of the display points is generally composed of the encoding values of many object points. In a calculation unit, the calculation of the encoding values is in this case usually carried out with a higher resolution than the actual panel bit depth. Only after calculation of the encoding values normalization and imaging onto the pixel values are carried out, where, for example, nonlinearities of the gamma curve or other pixel-dependent calibration values may be taken into account.

Furthermore, a plurality of different or similar pixels or subpixels of the spatial light modulation device are often combined to form a macropixel. They may, however, also be spatial light modulation devices in which this is not the case. Such spatial light modulation devices may likewise be used according to the invention.

FIG. 1 shows a device in which the generation of subholograms for a multiplicity of object points at different depths with respect to a spatial light modulation device SLM is carried out as a projection of a virtual visibility region VW via the respective object point onto the spatial light modulation device SLM.

It can be seen clearly that the position of the subholograms on the spatial light modulation device is dependent on the relative position of the object points with respect to the visibility region, also referred to as an observer window. Furthermore, the dimension or extent or size of the subholograms is dependent on the z position of the encoded object points, where by z is the distance of the object point with respect to the spatial light modulation device. Overlapping of subholograms is usually carried out in this case.

Object points which are located at a distance far from the entrance pupil of the eye of an observer, that is to say for example near to the plane of the spatial light modulation device, or also in the case of a head-mounted display (HMD) or a head-up display (HUD) near to the virtual plane of the spatial light modulation device, have a subhologram which is small in their size or extent. Small subholograms may for example have a lateral extent of 10 pixels in the case of one-dimensional (1D) encoding of a hologram, or a lateral extent of 10×10 pixels in the case of two-dimensional (2D) encoding of a hologram.

For a holographic reconstruction of scenes, preferably three-dimensional scenes, subholograms are used in conjunction with a virtual visibility region, also referred to as an observer region or observer window, through which an observer can observe the reconstructed scene.

To this end, two methods, which may be used to calculate and generate holograms, are employed in particular, the projection method according to FIG. 1 or the Fourier transform method.

In the projection method, the outlines of a virtual visibility region in an observer plane are projected through an object point onto a spatial light modulation device (referred to below as an SLM) and generate a subhologram on the SLM. In other words, by projection of the outlines of the virtual visibility region, outlines of a subhologram are formed or generated on the SLM. The phase function, which is intended to reconstruct the object point, is then encoded in the subhologram. The amplitude function, or simply amplitude, in the subhologram is in a simplest configuration set to the same value for all pixels of the subhologram and selected in such a way that the subhologram reconstructs the object point with a predetermined intensity. The virtual visibility region in the observer plane is limited in its size to one diffraction order of the resulting diffraction pattern. Because of this restriction of the virtual visibility region to one diffraction order, other diffraction orders are not visible in the virtual visibility region.

In the Fourier transform method, the preferably three-dimensional (3D) scene is decomposed into planes parallel to the surface of the SLM. The intensity distributions in the individual planes are then propagated into the observer plane by means of Fourier transform (FT) after multiplication by a phase factor. There, the complex amplitude in the virtual visibility region is summed up and propagated into the plane of the SLM, again by means of Fourier transform, after multiplication by a phase factor again. The phase factor is in this case dependent on the distance of the planes between which transformation is carried out.

Both methods, both the projection method and the Fourier transform method, lead to a hologram which reconstructs a two-dimensional and/or three-dimensional scene visible from the virtual visibility region.

With respect to head-mounted displays (HMDs), head-up displays (HUDs) or projection displays with a real or virtual image of the SLM, the term "SLM" used here is intended to refer to the image of the SLM, which is visible from the virtual visibility region.

In the projection method, in a simplest configuration, the amplitude of a subhologram is constant over the extent of the subhologram. There are, however, also configurations in which this amplitude is variable over the extent of the subhologram, for example by multiplication by the reciprocal of the Fourier transform of the pixel transmission, in order to obtain a more uniform brightness distribution in the virtual visibility region.

In comparison with the projection method, the Fourier transform method achieves a higher quality of the reconstructed scene since it is based on wave propagation. The calculated wave propagation from the individual object points into the observer plane corresponds to the light propagation which would take place from a real object point into the observer plane. Because of the limitation of the hologram calculation to the region inside the virtual visibility region, a sharply delimited region is formed in this observer plane, namely the sharply bounded virtual visibility region, also referred to as observer window, from which the reconstructed object point of the scene is visible.

The transformation from the virtual visibility region into the plane of the SLM follows the path of the light propagation with wave propagation back from the virtual visibility region to the SLM.

This calculation of a hologram leads in the plane of the SLM to subholograms of the individual object points of the scene, although these are not sharply delimited but fall off gradually. The term "fall off gradually" is to be understood here in the sense that the amplitude of the subholograms does not decrease abruptly from one pixel to the next adjacent pixel, from a maximum value to a value of 0, but for example decreases stepwise over a plurality of pixels from a maximum value to 50%, 10%, 2%, 0.5%, 0.1%, ... of this value. The percentages indicated serve only for exemplary illustration. It happens in this case that the amplitude also does not decrease over many pixels exactly to a value of 0, but has very small but nonzero values. While in the projection method the subhologram size is defined by the region in which the amplitude of the subhologram is not equal to zero, in the Fourier transform method the extent of a subhologram may also be described as the region in which the amplitude is greater than a particular percentage of its maximum value. In the context of this invention, the term "size of the subhologram" is used as derives from the projection method.

The result of this effect is therefore that, during the calculation backward from the virtual visibility region onto the SLM with wave propagation, the sharply bounded virtual visibility region acts as a diffractive opening.

Since the light path from the virtual visibility region to the SLM backward is calculated with wave propagation, when the SLM is illuminated in a suitable way, conversely the light propagation from the subhologram to the virtual visibility region thus again gives a sharply delimited virtual visibility region.

The Fourier transform method therefore leads to a very good reconstruction quality. However, the method increases the requirements in relation to the hardware required and the energy consumption for real-time calculation of holograms. The energy consumption may for example play an important role in mobile equipment, for example in the case of an HMD.

With respect to the Fourier transform method, a decomposition of the preferably three-dimensional scene is generally carried out first into depth planes which are at least approximately parallel to the plane of the SLM. During the calculation, it is in this case assumed that the SLM is configured to be flat and the virtual visibility region is located in a plane parallel to the flat SLM.

In general, however, an SLM may also have a curved shape. For example, there are already curved television sets (curved TV) in which the SLM is configured to be curved. Similarly, it would also be possible to realize curved displays, in particular curved holographic displays. It is also possible for the real or virtual image of a planar SLM in an HMD, HUD or projection display to be curved because of imaging errors. In principle, therefore, an SLM may also be tilted relative to the virtual visibility region, so that an observer of the scene looks obliquely at the SLM.

In these cases, the plane of the SLM, or at least parts thereof, would no longer be parallel to the observer plane. Although the preferably three-dimensional scene can still be decomposed into depth planes and a transformation of these depth planes into the virtual visibility region can be carried out, a transformation from the virtual visibility region into the plane, which is curved or is tilted with respect to the virtual visibility region, of the SLM could however no longer be carried out straightforwardly with a Fourier transform or Fresnel transform.

The Fourier transform method is an approximation method, which describes the light propagation from the SLM to the virtual visibility region well for the case in which the extent of the SLM (or, in the case of an HMD, HUD or projection display, of the image of the SLM) is much less than the distance between the SLM and the virtual visibility region. The extent of the SLM defines, for a virtual visibility region at a predetermined distance, a frustum (a kind of frustoconical region or extent) and therefore establishes the field of view (FoV) at which an observer can observe a two-dimensional and/or three-dimensional scene from the virtual visibility region.

For particular types of displays, for example for a holographic HMD, it is an aim to obtain a field of view which is as large as possible. For example, for a display with a 60° field of view or a larger field of view, the extent of the SLM (in this case of the image of the SLM) is similarly large or even larger than the distance between the SLM and the virtual visibility region. As a numerical example for a 60° field of view, it has been found that the extent of the SLM is a factor 2 tan)(30° (i.e. about 1.15) times as great as the distance between the SLM and the virtual visibility region.

When a large field of view is generated by temporal or spatial tiling (stringing together) of smaller SLMs or images of SLMs, the extent of the SLM is in this case to be understood as the extent of the SLM, or image of the SLM, composed of tiles. Then, for object points of a preferably three-dimensional scene at the edge of the field of view, under certain circumstances the calculation with the Fourier transform method generates subholograms which could only lead to an insufficient reconstruction of the object point.

In contrast to the Fourier transform method, the projection method is based on geometrical optics and therefore neglects diffraction effects. By means of this projection method, sharply delimited subholograms are calculated. This means that the amplitude, or the amplitude profile, of the subhologram decreases abruptly to a value of 0 from one pixel to the next adjacent pixel.

The light emitted by an illumination device and incident on the subholograms is diffracted at the edges of the subholograms. This diffraction at the edges of the sharply bounded subholograms, however, leads to a virtual visibility region whose edges are not sharply delimited but are blurred or fuzzy, or even indistinct. In a similar way, as the edge of the virtual visibility region is blurred or indistinct, the higher diffraction orders, in which multiple reconstructions of an object point are visible, are also no longer sharply delimited in the observer plane, but are likewise blurred or fuzzy. Superpositions with higher diffraction orders may therefore take place, particularly in the edge region of the virtual visibility region. In the region of the virtual visibility region in which these superpositions take place, multiple diffraction orders of an object point are then visible for an observer of the scene, whose eye pupil lies in this region.

The diffraction effects at the edges of the sharply bounded subholograms are of commensurately greater importance when the subholograms are smaller in their extent or size. Subholograms which are small in their extent exist, in particular, when object points of the preferably three-dimensional scene are being encoded which lie close to the plane of the SLM, or have a short distance from this plane. In the case of subholograms which are only a few pixels in size, under certain circumstances the crosstalk of higher diffraction orders extends not only over the edge of the virtual visibility region but even over the entire width of the virtual visibility region.

Although the projection method leads to a slightly reduced reconstruction quality in comparison with the Fourier transform method, particularly for object points in a depth region very close to the SLM, the projection method may nevertheless preferably be used for a real-time calculation since subholograms can thereby be calculated very rapidly and efficiently. The projection method is therefore more cost efficient and less time-consuming than the Fourier transform method.

The slightly reduced reconstruction quality when using the projection method could be important when the virtual visibility region is configured to be very small in its extent or size. The virtual visibility region should therefore have at least the size of the eye pupil of an observer's eye. If there were crosstalk of higher diffraction orders at the edge of the virtual visibility region, in the case of an about 5 mm large virtual visibility region, for example, which is therefore approximately as large as a typical 3-5 mm large eye pupil of an eye, this would have a greater effect than for example in the case of an about 10 mm large virtual visibility region. In the case of a virtual visibility region which is larger in its extent, for example about 10 mm large, by observer tracking it is possible to control that the observer with his eye is in the central region and not in the edge region of the virtual visibility region. Disturbances in the edge region of the virtual visibility region would therefore be not visible, or only rarely visible, when observing the reconstructed preferably three-dimensional scene. The use of a virtual visibility region which is as small as possible in its size could, however, be advantageous insofar as it would make it possible to use an SLM having pixels which are fewer in number and larger (or larger pixel images in an HMD or a projection display).

Furthermore, projection of the outlines of the virtual visibility region through the object point onto the SLM would also make it possible to determine the position of a subhologram on the SLM when the SLM has a curved surface or is tilted relative to the virtual visibility region.

Projection of the outlines of the virtual visibility region through the object point onto the SLM furthermore makes it possible to then determine the position of the subholograms correctly even when there is a very large field of view (FoV).

The size of a subhologram on the SLM will be defined in more detail below.

For an SLM, a pixel pitch may be determined as the distance between the center points of two neighboring pixels. In general, an SLM has a rectangular or square pixel grid. This then gives a horizontal and vertical pixel pitch.

If, for a particular encoding method, a plurality of pixels are combined to form a macropixel in the SLM, the pitch of the macropixel represents an integer multiple of the pixel pitch of the SLM. In what follows, the pitch p refers to the pitch of a macropixel. If, instead of a direct view display there is a display with imaging of the SLM, which is visible from a virtual visibility region or observer window, then p refers to the pitch of the image of the macropixel.

At an observer distance D from a display, which modulates light with the wavelength $\lambda$, the diffraction order of the macropixel has a size of $B=D\lambda/p$.

With a rectangularly configured pixel matrix, this generally leads to a horizontal diffraction order from the horizontal pitch and a vertical diffraction order from the vertical pitch.

The size of a virtual visibility region VW in an observer plane at the observer distance D is selected in such a way that the virtual visibility region is at most as large as the diffraction order B. Conventionally, the virtual visibility region VW is selected according to the formula $VW=D\lambda/p$. The virtual visibility region may, however, also be smaller in its size or extent than a diffraction order.

In the projection method for determining subholograms, rays are geometrically traced, or placed, from the edge of the virtual visibility region through an object point P to the SLM.

If the virtual visibility region is parallel to the SLM and the distance of an object point P with respect to the display is z and with respect to the virtual visibility region is D-z, the following is obtained according to the intercept theorem for the size of the subhologram $$sh=|z/(D-z)|vw,$$

where the distance z is selected here to be positive when the object point lies between the display, or the SLM, and the virtual visibility region and is selected to be negative when the object point lies behind the display, as seen from the observer plane.

The size of a subhologram in pixels is determined by calculating sh/p and rounding to an integer value $$Nsh=\text{int}(sh/p).$$

For the case in which the virtual visibility region VW is selected to be equally large in its extent as a diffraction order, i.e. VW=Dλ/p, then $$Nsh=\text{int}(Dz/(D-z)\lambda/p^2).$$

For a display with an observer distance D of 2 m and with a pixel pitch p of 156 µm, for example for a wavelength of λ=470 nm, there is a diffraction order with an extent of 6 mm. If the size of the virtual visibility region is selected to be equal to the size or extent of the diffraction order, then for an object point 50 cm in front of the display the subhologram is sh=2 mm large and has a pixel number of Nsh=13 pixels.

For a rectangularly configured pixel grid there is a horizontal value of Nsh_hor for the size of the subhologram in pixels and a vertical value of Nsh_vert for the size of the subhologram in pixels. The total number of pixels in a subhologram is then the product Nsh_hor*Nsh_vert.

In the following description, the size or extent of a subhologram refers to the size in pixels Nsh.

In particular, in the case of a rectangularly configured pixel grid, the smaller of the two values: Nsh_hor or Nsh_vert is used for classifying the size of a subhologram.

A subhologram may thus also be regarded as small when, for example, it is only 5 pixels wide in the horizontal direction but is 50 pixels high in the vertical direction.

One exception is provided by single-parallax encoding, in which only the size in pixels in the encoding direction is used for classifying whether a subhologram is small.

SUMMARY OF THE INVENTION

It is therefore an object of the present invention to provide a method for generating and calculating holograms with which a sufficiently high quality of a reconstructed scene, preferably a three-dimensional scene, is made possible and crosstalk with higher diffraction orders in the edge region of a virtual visibility region is avoided. A further intention is to achieve real-time calculation of a hologram, which is similar to the projection method in computational effort.

It is furthermore an object to reduce the disturbing influence of diffraction effects on the virtual visibility region, the intention being to avoid other diffraction orders, which are not intended for the virtual visibility region, becoming visible in the virtual visibility region and the quality of the reconstructed scene therefore being decreased or reduced. The intention is furthermore to make it possible to achieve this high reconstruction quality even on a spatial light modulation device with a surface which is curved or tilted relative to the virtual visibility region. A sufficiently high reconstruction quality is furthermore intended to be achieved even in a holographic display with a very large field of view.

This object is achieved according to the invention by a method as claimed in claim 1.

The method according to the invention is used for generating holograms for encoding in a spatial light modulation device for a holographic display for representing a two- and/or three-dimensional scene. The scene to be reconstructed is decomposed into object points and encoded in a hologram, which is subdivided into subholograms, in the spatial light modulation device. Object points are encoded into encoding regions on the spatial light modulation device. Each object point of the scene is therefore encoded in its corresponding encoding region on the spatial light modulation device, which will be referred to below as SLM. A size and/or a shape of the encoding region on the SLM is selected in relation to a size and/or shape of a subhologram, assigned to the encoding region, in such a way that crosstalk of higher diffraction orders in a virtual visibility region is reduced.

To this end, for example, the encoding region may advantageously differ in its size and/or shape from the size and/or shape of a subhologram which is assigned to the encoding region and is determined by an object point if this reduces crosstalk of higher diffraction orders in a virtual visibility region. It may, however, also be possible for the encoding region to correspond in its size and/or shape to the size and/or shape of a subhologram if this advantageously prevents or reduces crosstalk.

The invention proposes a method in which, for each individual object point of the scene to be reconstructed, for the encoding of this object point in the SLM an encoding region on the SLM is generated, which may correspond precisely in its size, extent and shape to a conventionally defined subhologram determined by the object point, but according to the invention may also differ from this conventional subhologram, depending on the object point to be reconstructed. Considered in detail, this means that the encoding region for an object point may also be larger in its size or extent than the subhologram. This means that although the encoding region may be configured to be larger than the extent or size of the subhologram assigned to it, it nevertheless also means that the extent or size of the encoding region is smaller or much smaller than the total area of the SLM. It is, however, also possible that the encoding region is configured to be smaller than the corresponding subhologram, or may lie inside the area of the subhologram. Furthermore, it is also possible that the encoding region corresponds precisely to the size or extent of the subhologram.

Furthermore, it is now possible according to the invention that the encoding region, if it is larger or smaller than the subhologram or even has approximately the size of the subhologram, may have a different shape or contour than the subhologram. If the subhologram is configured to be rectangular, for example, the encoding region could also be configured to be oval, round, hexagonal or even square. These are only examples, which are not intended to restrict the shape of the encoding region thereto.

Now, according to the invention, an encoding region for an object point on the SLM is therefore generated and calculated, which region differs, or in particular situations may differ, from the previous definition of a subhologram.

It is, of course, also possible, contrary to this procedure presented above to explain the invention, to speak of a subhologram which is increased or reduced in its extent, since, as is known, the subhologram constitutes the area of the encoding of the object point on the SLM. Therefore, the subholograms according to the invention could now be subholograms generated to be larger, equal or smaller in their extent compared to those generated with the previously known method. Correspondingly, this subhologram may also have a different shape than the previously known, usually rectangular, subholograms. As already explained above, the subhologram may assume a round, oval, rectangular, hexagonal, square or any other shape.

In other words, conventional subholograms are used. Now, in a straightforward way, the size of the subhologram is reduced, or even increased beyond its extent, in order by means of the modified proportion of the area—in comparison with neighboring subholograms and therefore assigned neighboring reconstructed object points—to achieve optimized adaptation of the proportion of the area and therefore the target intensity values of the reconstructed object points.

The region of the encoding of the object point can therefore be extended onto the SLM to a region outside the projection area of the virtual visibility region or the entrance pupil of an observer's eye. A number of pixels of the SLM, which are used for example to encode an individual object point or also a plurality of object points, may for example vary greatly in the number of used, i.e. assigned, pixels of the SLM depending on the required bit depth, even if the position of the object point or points in space does not change.

The invention will, however, be explained below only with one presented procedure, namely with the first mentioned, in which the encoding region may be configured and generated to be larger, equal to or smaller than the subhologram.

The field of view constitutes the angle which is spanned at a typical observer distance from the display, or from the SLM, from a central position to the edges of the display, and which also corresponds to the aperture angle of the frustum. For example, a display screen with a size of 300 mm horizontally×200 mm vertically at a distance of 1 meter with respect to an observer has a field of view of about 17 degrees horizontally (2×arc tan(150/1000)) and 11.5 degrees vertically. This example may still be regarded as a small to medium field of view.

In the case of a large display, and therefore a large or wide field of view, for example a field of view SF≥30 degrees, although an observer would look perpendicularly at the middle, or the central region, of the display, when the observer observes an object at the edge or in the edge region of the display, he would very likely rotate his eyes and/or head with him. It is therefore proposed, for the middle, or the central region, of the display, or of the SLM, to calculate a virtual visibility region which is formed parallel to the display. For the edge regions of the display, it is proposed to calculate a virtual visibility region which is configured to be tilted or at an angle with respect to the display, or SLM, corresponding to the angle at which the observer typically looks obliquely at the display.

With such a method for generating and calculating holograms, a sufficiently high or very high quality of a reconstructed scene, preferably a three-dimensional scene, can be achieved. Furthermore, this method straightforwardly and rapidly allows calculation of a hologram in real time, without impairing the accuracy in the calculation of the holograms.

Further advantageous configurations and refinements of the invention may be found in the dependent claims.

In a preferred embodiment, the invention is based on a modified projection method. This means that the hologram of the scene to be reconstructed is generated and calculated essentially by the projection method, although depending on the distance of the object points in space with respect to the SLM and/or depending on the subhologram size which would be obtained by the production method, a decision is made whether the projection method or the Fourier transform method is used. The projection method may therefore be combined with the Fourier transform method in order to calculate the total hologram, comprising encoding regions and subholograms, of the scene to be reconstructed. This means that, in particular cases, encoding regions on the SLM are calculated by the projection method and other encoding regions on the SLM are calculated by the Fourier transform method, all the encoding regions together giving the hologram, or the total hologram, by which the scene is reconstructed. In other cases, in turn, all the encoding regions of a hologram are generated and calculated by means of the projection method. In yet other cases, all the encoding regions of a hologram are generated and calculated only by means of the Fourier transform method.

In one embodiment of the invention, those object points for which encoding regions and subholograms are calculated according to the projection method and those object points for which encoding regions and subholograms are calculated according to the Fourier transform method may be determined dynamically by a detected distance or a lateral position of an observer or a viewing angle of the observer at the display or at the SLM.

In the modified projection method according to the invention, in one embodiment of the invention a subhologram for an object point is generated and calculated according to the method according to FIG. 1. This means that a virtual visibility region is projected via the object point onto the SLM so that a subhologram is generated. In this case, a defined phase function, which reconstructs the object point, is encoded in the subhologram. The amplitude of the subhologram does not, however, contain any abrupt transition from a maximum value to a value of 0 at the edge of the subhologram, but instead has an amplitude profile decreasing constantly toward the edge region of the subhologram. Advantageously, therefore, the value of the amplitude in the subhologram is reduced continuously toward the edge region of the subhologram when the case is such that the encoding region has the same size and shape as the subhologram. In all other cases, the value of the amplitude in the encoding region for the object point may be reduced continuously toward the edge region of the encoding region.

This amplitude profile in the subhologram for an object point to be reconstructed may be determined in different ways in advantageous embodiments.

In this case, as already explained briefly, in some embodiments of the invention the subhologram is optionally "increased" metaphorically in comparison with the size determined geometrically by the projection method so that the originally formed subhologram is preserved in its size or extent, but an encoding region is generated which is larger in its size or extent than the subhologram. The object point is then encoded into the encoding region. The encoding region on the SLM may therefore have a different size or extent than the subhologram generated with the original projection method or than as prescribed as the virtual visibility region by the geometrical projection onto the SLM. The shape of the encoding region on the SLM also does not need to correspond to the shape of the subhologram or of the virtual visibility region, i.e. in the case of a rectangular subhologram or virtual visibility region, the encoding region may for example also be round, or vice versa. In this case, the exact shape of the encoding region is restricted by the pixel grid on the SLM. A round encoding region or subhologram is, for example, to be understood in the sense that a round shape is approximated by selection of rectangular pixels of the SLM. In other words, the function which reconstructs the object point is not only encoded or written in the region of the subhologram in the SLM, but may also be written into pixels which lie outside the subhologram and surround the latter adjacently so that an encoding region is generated or provided on the SLM. In this embodiment, the encoding region is larger in its size or extent than the subhologram, or it may also have a different shape than the subhologram.

In other embodiments of the invention, the subhologram is "decreased" metaphorically in comparison with the size determined geometrically by the projection method so that the originally formed subhologram is preserved in its size or extent, but an encoding region is generated which is smaller in its size or extent than the subhologram. The object point is then encoded or written into this encoding region. The encoding region on the SLM may therefore have a different size or extent than the subhologram generated with the original projection method or than as prescribed as the virtual visibility region by the geometrical projection onto the SLM. The encoding region for the object point is smaller in its size or extent than the subhologram or the virtual visibility region as is prescribed by the geometrical projection. It is also possible for the size or extent of the original subhologram to remain unchanged so that an encoding region is provided which corresponds to the size or extent of the subhologram or which corresponds to the size or extent of the virtual visibility region prescribed by the projection.

In one simplified embodiment of the invention, for example, the encoding regions can be calculated in such a way that, after the geometrical projection of the virtual visibility region onto the spatial light modulation device,
- the amplitude in the subhologram generated is set to a constant value for all pixels of the subhologram,
- for pixels present in the edge region of the subhologram, the value of the amplitude is respectively reduced continuously by a predefined value, and
- the subhologram is increased in its extent by pixels in order to generate the encoding region for the object point, the value of the amplitude of these pixels being further reduced continuously up to a threshold value.

The size of the subhologram is therefore firstly determined geometrically with the modified projection method. This method is furthermore also suitable for SLMs with a surface which is curved or tilted relative to the virtual visibility region, or also for a holographic display with a very large field of view.

For the calculation of subholograms by means of transformation, here the Fresnel transform, from the virtual visibility region into the SLM, before application of a Fourier transform, a phase factor is first multiplied onto the calculated values. This phase factor depends on the distance of the two planes, between which transformation is carried out, i.e. in this case on the distance between the virtual visibility region and the SLM. A uniform constant distance, and therefrom a phase factor for the calculation, can however only be determined when the two planes are configured parallel to one another. If, for example, the SLM is configured to be curved or is tilted relative to the virtual visibility region, a uniform distance between the SLM and the virtual visibility region cannot be determined, or the distance varies with the position within the plane. The transformation cannot therefore be carried out in the conventional way.

A geometrical projection, in which the rays from the edge of the virtual visibility region are traced through an object point to the SLM, in order to determine the position of a subhologram and/or encoding region, may however be carried out independently of the shape and the relative orientation of the SLM with respect to the virtual visibility region. The case could in fact arise that rays from the virtual visibility region through the object point do not strike, or only partially strike, the SLM. If, for example, the rays do not strike the SLM, the object point of the scene cannot be represented because it lies outside the frustum. If only a part of the rays strikes the SLM, under certain circumstances the object point is visible only from a part of the virtual visibility region. In both cases, calculation of a subhologram with a transformation would not actually deliver a substantially better result.

For the calculation of a subhologram by means of projection, the phase profile in the subhologram may be determined with the aid of the geometrical distance from the object point to the individual pixels—or more precisely to the centers of the pixels—of the SLM. The phase profile of a field lens present in the holographic display would possibly also still need to be subtracted from the phase values determined with the aid of the distance.

In the case of a planar SLM, which is parallel to the virtual visibility region, a spherical lens function is in this case conventionally obtained as phase profile in the subhologram and therefore in the encoding region. This lens function may also be calculated in a straightforward way directly by means of its focal length, without examining in detail the distances of the object points with respect to the SLM. The focal length is, for example, determined by taking into account the focal length of a field lens present in the holographic display, as $1/f\_sub = 1/z - 1/f\_field$ lens, where $f\_sub$ is the focal length of the subhologram, $f\_field$ lens is the focal length of a field lens and $z$ is the distance of the object point with respect to the SLM.

The determination of the phase by means of the distances from the object point to the center points of the individual pixels of the SLM is advantageous on the other hand for curved and tilted SLMs, since the phase profile then often cannot be described by a simple lens function.

After generation of the subhologram, the amplitude in the subhologram is firstly set to a constant value A for all the pixels, similarly as in the case of a projection. Then, for the outer pixels in each case, for example the 4 outer pixels in each case, within the geometrical subhologram (in the left, right, upper, lower edge regions) the amplitude is set to a predefined value of A, for example a value of 95%, 85%, 70%, 50% of A. The percentage values are used here only as an example of a bell-shaped amplitude profile. It is of course possible to use other percentage values. The subhologram is then increased relative to the geometrical calculated size or extent of the subhologram respectively (in the left, right, upper, lower edge regions) by a particular number of pixels, for example by 3 pixels in each case. The amplitudes of this particular number of pixels may then be set to a predefined value of A up to a threshold value, for example a value of 30%, 15%, 5% of A. These percentage values also serve only for illustration, the amplitude values are therefore not restricted to these percentages. The geometrically calculated width of the subhologram therefore now corresponds to the value at which the amplitude has decreased to 50% in the encoding region. Instead of a jump from a maximum value A to a value of 0 (zero) over one pixel, now according to the invention a constant decrease over a defined number of pixels takes place up to a threshold value, here in this example over seven pixels. The threshold value may, for example, advantageously be set to a value of 1% of the maximum amplitude in the encoding region, i.e. a threshold value of 1% of the maximum amplitude in the encoding region is selected.

For encoding regions which are configured to be smaller in their size than the subhologram, it may advantageously be provided that, after the geometrical projection of the virtual visibility region onto the spatial light modulation device,
- the subhologram is reduced in its extent by pixels in order to generate the encoding region for the object point,
- the amplitude in the encoding region generated is set to a constant value for all pixels of the encoding region, and
- for pixels present in the edge region of the encoding region, the value of the amplitude is respectively reduced continuously by a predefined value up to a threshold value.

The threshold value may, for example, advantageously be set to a value of 1% of the maximum amplitude in the encoding region, i.e. a threshold value of 1% of the maximum amplitude in the encoding region is selected.

For all three possibilities according to the invention for the size or extent of an encoding region, i.e. the encoding region may be larger, equal to or smaller in its size than the size of the subhologram assigned to it, a bell-shaped amplitude profile may advantageously be generated in the encoding region.

In another advantageous embodiment of the invention, it may be provided that an apodization function is encoded into the encoding region for the object point in the spatial light modulation device, or calculated values of the encoding region for the object point are multiplied by an apodization function, the apodization function having a maximum amplitude value in the central region of the encoding region and decreasing to a value of 0 toward the edge region of the encoding region.

According to the invention, the encoding region determined according to the projection method may be provided with an apodization function which influences the amplitude and/or the phase of the encoding region. The apodization function may, for example, be configured in such a way that it realizes the amplitude profile that decreases constantly according to the invention in the encoding region. For example, the apodization function may be configured as a cosine-squared function, which assumes a maximum value in the middle of the encoding region and decreases to a value of 0 toward the edge region of the encoding region on the SLM. In this way, a better-delimited virtual visibility region is formed in the observer plane than in the case of a rectangular amplitude profile in the subhologram. As a result of this better-delimited virtual visibility region, an observer can observe a reconstructed scene without disruptive diffraction effects occurring in the virtual visibility region and affecting the quality of the reconstructed scene or disturbing the observer when observing the scene.

The "observer plane" is usually described as a plane, and the virtual visibility region is formed flat in this plane. In real terms, however, there is a small volume in which an observer sees a two-dimensional and/or three-dimensional scene. The observer plane is therefore only a section at its widest position through this volume. Nevertheless, the calculation of subholograms is advantageously carried out only by means of this plane, without taking the volume into account.

It may advantageously be provided that an encoding region is respectively calculated once by means of a Fourier transform for an object point at a particular depth with respect to the spatial light modulation device, the exact, or alternatively approximated, amplitude profile of the calculated encoding region being stored in a look-up table. Such a calculation is repeated for object points at different selected depths which scan the entire possible depth region of a three-dimensional scene. There is then a look-up table for each depth of the depth grid.

As already described, in the Fourier transform method the case may arise that subholograms also have albeit very small but still nonzero amplitudes over a large number of pixels. Yet since very small amplitudes contribute only insubstantially to the reconstruction of an object point, the storage space for a look-up table would disadvantageously increase. Expediently, therefore, amplitudes which lie above a defined minimum value are stored in the look-up table. For example, the minimum value may be 1% of the maximum amplitude of the subhologram.

During the calculation of the hologram of a three-dimensional scene, each object point of the scene is assigned to the closest depth position of the grid, and the look-up table associated with this depth position is used in order to produce an encoding region for the object point.

In another advantageous embodiment of the invention, it may be provided that an encoding region is calculated once by means of a wave propagation method other than a Fourier transform, preferably by means of Huygens' wavelets, for an object point at different depths and in different lateral positions with respect to the spatial light modulation device, the amplitude profile of the calculated encoding region being stored in a look-up table.

With this procedure, the calculation of an encoding region is respectively carried out for a scene from an individual object point, which is respectively arranged at various depths and at various lateral positions with respect to the SLM, with a wave propagation method other than the Fourier transform, for example by using Huygens' wavelets. The calculation of the encoding regions by means of wavelets is however more calculation-intensive, but under certain circumstances, particularly in the case of a large field of view, may achieve a better result than calculation with the Fourier transform method. The exact or optionally even approximated amplitude profile of the encoding region determined in this way may in this case as well be stored in a look-up table.

During the wave propagation from the virtual visibility region to the SLM, aberrations of an optical system provided in the display could also advantageously be compensated for, and the encoding regions could be calculated in such a way that they also at the same time include this aberration correction or these aberration corrections.

For real-time calculation of the encoding regions, the position of the encoding regions on the SLM, and the phase functions encoded therein, are then calculated according to the modified projection method according to the invention. The amplitude profile of the encoding regions is, however, taken from the values of the look-up table for object points at an equal or at least similar depth, and optionally an equal or at least similar lateral position.

Advantageously, in order to save on storage space for the look-up tables, the amplitude profile in a look-up table may respectively be stored only for object points having a reference intensity A. If, however, an object point at the same depth with respect to the SLM but having an intensity B is intended to be calculated, the amplitude profile for the individual pixels of the encoding region is taken from the look-up table. In this case, the amplitudes for each pixel are in addition also multiplied by a factor $(B/A)^2$, the square of this factor relating to the fact that intensities are proportional to the square of the amplitude. In other words, the amplitude profile is respectively stored in a look-up table only for object points having a reference intensity A, while for an object point which has an intensity B and is located at an equal depth with respect to the spatial light modulation device as an object point having an intensity A, the amplitude profile for the individual pixels of the associated encoding region is taken from the look-up table and the amplitudes for each pixel are multiplied by a factor $(B/A)^2$.

Furthermore, it may advantageously be provided that, in the case of a small distance of the object point with respect to the spatial light modulation device, for example less than 5% of the observer distance with respect to the spatial light modulation device for a display with a size of a virtual visibility region of more than 10 mm, or preferably less than 10% of the observer distance with respect to the spatial light modulation device for a display with a size of a virtual visibility region of between 5 mm and 10 mm, and/or in the case of a large angle of the object point with respect to the virtual visibility region, for example more than 20 degrees or 30 degrees, the encoding region is determined from a subhologram which is calculated with a Fourier transform method and/or by means of Huygens' wavelets.

According to the invention, the hologram calculation may be a combination of a projection method and a Fourier transform method and/or calculating with another wave propagation method, for example Huygens' wavelets. In the case of a small distance of the object point with respect to the SLM and/or a large angle with respect to the virtual visibility region, the hologram is advantageously calculated with the Fourier transform method and/or wave propagation method. In the case of a large distance of the object point with respect to the SLM, for example greater than/equal to 5% of the observer distance with respect to the SLM, and optionally a restricted angular range with respect to the virtual visibility region, for example less than/equal to 20 degrees or less than/equal to 30 degrees, the hologram is advantageously calculated with the less calculation-intensive modified projection method. The projection method may therefore be used for small angles of a tilted SLM, while Huygens' wavelets may be used in order to calculate encoding regions for large angles, or large tilt angles of an SLM.

In other words, in the case of a large distance of the object point with respect to the spatial light modulation device, preferably greater than or equal to 5% of the observer distance with respect to the spatial light modulation device for a display with a size of a virtual visibility region of more than 10 mm, or greater than or equal to 10% of the observer distance with respect to the spatial light modulation device for a display with a size of a virtual visibility region of between 5 mm and 10 mm, and/or in the case of a small angle of the object point with respect to the virtual visibility region, the encoding region may be determined from a subhologram which is calculated with a projection method, in which the virtual visibility region is projected through the object point onto the spatial light modulation device and a subhologram is generated, the subhologram is extendible or reducible by pixels in order to generate the encoding region for the object point on the spatial light modulation device, a phase function is encoded into the encoding region, and an amplitude function is encoded into the encoding region in such a way that the object point is reconstructed with a predetermined intensity.

As an alternative, the calculation of the amplitudes of the encoding regions may also be carried out by means of a look-up table only for small distances of object points with respect to the SLM. Since these object points have relatively few pixels in their encoding area, the size of the look-up table required may then advantageously be limited.

For a display with a large field of view, the calculation of the encoding regions in the edge region of the field of view may likewise be carried out by means of a look-up table, while a central region of the field of view is calculated directly with the modified projection method according to the invention.

It may advantageously be provided that a limiting subhologram size is determined, and that, for all object points whose subhologram sizes are greater than or equal to this limiting subhologram size, encoding regions are calculated from subholograms with the projection method, and for all object points whose subhologram sizes are less than this limiting subhologram size, encoding regions are calculated from subholograms with the Fourier transform method or based on a look-up table.

In this case, a value of 5 pixels may advantageously be selected for the limiting subhologram size. Of course, other values also possible for the limiting subhologram size.

Furthermore, in a particular embodiment of the invention, those object points for which encoding regions and subholograms are calculated according to the projection method and those object points for which encoding regions and subholograms are calculated according to a wave propagation method may be determined by a detected distance or a lateral position of an observer or a viewing angle of the observer at the spatial light modulation device.

If, in particular cases, the width/size or extent of the virtual visibility region is selected to be less than corresponds to the extent of a diffraction order or selected to be equal to the extent of a diffraction order, this may be particularly advantageous in order to reduce or avoid the risk of multiple reconstructions of the scene by blurred edges of the virtual visibility region or overlaps with blurred edges of higher diffraction orders.

Because of the virtual visibility region, which is smaller than or equal to a diffraction order in its extent, a gap region is formed between the edge of the virtual visibility region and the higher diffraction order, and this gap may be used as a buffer. If, in a calculation with the modified projection method according to the invention, the virtual visibility region is nevertheless not sharply delimited but falls off gradually, then the higher diffraction order is also not sharply bounded. If a gap region is provided between the virtual visibility region and a higher diffraction order, however, an overlap of the virtual visibility region and the higher diffraction order is advantageously prevented.

In another advantageous embodiment of the invention it may therefore be provided that the extent of the virtual visibility region is selected to be less than or equal to the extent of a diffraction order, particularly that, in the case of a color reconstruction of the scene, the virtual visibility region is adapted in its extent to an extent of a diffraction order for the shortest wavelength used.

In most cases it is desirable to obtain a virtual visibility region which is as large as possible in its extent. During the calculation of holograms for a color reconstruction of a scene, however, it is rather the case that the size of the diffraction order scales with the wavelength used. At most one diffraction order for the shortest wavelength, in general the wavelength for blue light, is therefore usable as a size or extent of the virtual visibility region for a color reconstruction.

In principle, the encoding regions may also be calculated for green and red wavelengths on the basis of the assumption of a virtual visibility region of the full size of a diffraction order.

Advantageously, however, it is proposed here to carry out the calculation of the encoding region on the SLM by using a virtual visibility region of less than one diffraction order for the light of red and green wavelengths in its extent. This means that the calculation of the encoding region is adapted to the virtual visibility region for the light of blue wavelengths.

For the embodiment according to the invention with calculation of amplitudes by means of a look-up table, this would advantageously mean that, for calculation of the amplitude profile for the encoding region, transformation of the light propagation from the object point in an object plane into a complete diffraction order in the observer plane is carried out, amplitudes then being set to a value of 0 in an edge section of the diffraction order in the observer plane in order to generate a virtual visibility region which is reduced in its size in the observer plane. This therefore means that, in the case of calculating the amplitudes for the look-up table once by means of the Fourier transform method, transformation from an object plane into a full diffraction order in the observer plane is carried out first, but amplitudes are then set to a value of 0 in a section or edge region of the diffraction order in the observer plane in order to restrict the size of the virtual visibility region.

When using other wave propagation methods, for example Huygens' wave propagation, the calculation of the light propagation could advantageously be carried out only in a section of the diffraction order, since this reduces the computational effort for this method.

For the calculation according to the Fourier transform method, this procedure advantageously corresponds to multiplication of the calculated values for the amplitude in the diffraction order by a rectangle function, the extent of which is smaller than the diffraction order.

Instead of a rectangle function, for example, the calculated values of the light propagation into the diffraction order may also be multiplied by another function, preferably a smooth function, for example a Gaussian function or a cosine function. It may therefore advantageously be provided that the calculated values for the amplitudes in the diffraction order in the observer plane are multiplied by an apodization function, preferably a rectangle function, a Gaussian function or a cosine function, the extent of which is less than one diffraction order.

In particular, this procedure may advantageously be used for calculating amplitude values of the encoding regions for a look-up table. In this case, the effect of a cosine function or a Gaussian function would be that, for an observer who is in the edge region of the virtual visibility window, the perceived brightness of the preferably three-dimensional scene is reduced in comparison with the case in which the observer is in the region of the middle, or at the center, of the virtual visibility region, and also in comparison with a hologram calculation without using this function. At the same time, however, the crosstalk of higher diffraction orders into the virtual visibility region would also advantageously decrease. Since the total light intensity in the diffraction order in the virtual visibility region remains substantially the same, darkening of the edge region of the virtual visibility region also means that it advantageously becomes brighter at the center of the virtual visibility region.

A smooth profile of the intensities or amplitudes in the virtual visibility region, which decreases continuously toward its edge region but is not sharply limited, likewise leads during the calculation of encoding regions to a smoother amplitude profile in these encoding regions so that these encoding regions can be approximated more straightforwardly and with fewer pixels so that they can be stored favorably in a look-up table.

In this case, however, it should be noted that the pixel aperture and the transmission profile over this aperture also play a part in the calculation in the intensity profile in the observer plane so that the amplitude profile in the encoding region and the profile of the intensities in the virtual visibility region are not identical, but in the case of rectangular pixel transmission, for example, are also related to one another by means of a sinc function. Nevertheless, a calculational darkening of the edge region of the virtual visibility region also leads to a decrease of the amplitude in the edge region of the encoding region and vice versa.

As an alternative, in the case of direct hologram calculation with the modified projection method while not using a look-up table, the calculated values of the encoding region may optionally be multiplied by an apodization function. The apodization function may be made possible by means of various functions.

For example, the apodization function may be realized by means of a rectangle function. The rectangle function in this case has a value of 1 within a width of $-t_0$ to $t_0$ and a value of 0 (zero) outside this width. The width of the rectangle function is to be selected in such a way that no other diffraction orders enter the eye pupil of an observer's eye. It is possible that higher diffraction orders may be visible near of the edge region of the virtual visibility region. However, the virtual visibility region is tracked with the eye pupil of the observer in such a way that the edge region of the virtual visibility region is not provided, or is not provided close, to the eye pupil of the observer. The rectangle function could therefore be configured to be narrower in its width than the geometrically determined width of the encoding region. The encoding region then becomes smaller in its extent. It may be possible for the reconstructed object point of the scene not to have a high reconstruction quality in the edge region of the virtual visibility region so that the object point is not easy to see. On the other hand, crosstalk of higher diffraction orders in the virtual visibility region could advantageously be avoided in this way.

It is furthermore possible also to implement the apodization function by means of a Gaussian function. The Gaussian function in this case has a value of 1 at its center and decreases according to the formula $(\exp(-(r/w)^2))$ toward its edge, r being the distance from the center of the function and w being the $e^{-2}$ width of the function. Since the Fourier transform of a Gaussian function is also a Gaussian function, the virtual visibility region is also apodized essentially with a Gaussian function. Higher diffraction orders therefore enter the virtual visibility region only attenuated. The higher diffraction orders are therefore not visible in the virtual visibility region with a suitable choice of the width w of the Gaussian function and/or when the virtual visibility region is tracked with the observer's eye in such a way that the eye pupil of the observer's eye is at least most of the time at the center of the virtual visibility region.

Furthermore, the apodization function could also be implemented by means of a cosine-squared function. The conditions mentioned for the rectangle function or Gaussian function also apply for this function. The invention is, however, not intended to be restricted to the functions mentioned. That is to say, other suitable functions could also be used as an apodization function.

In the case of full-parallax hologram encoding, during the calculation according to the Fourier transform method, from a square or rectangular virtual visibility region, square or rectangular subholograms are generally likewise calculated in the SLM. In general, the horizontal extent of the virtual visibility region is related to the horizontal pixel pitch of the SLM. The vertical extent of the pixel pitch of the SLM is generally related to the horizontal pixel pitch of the SLM. An observer who with his eye is inside the virtual visibility region formed in this way, can therefore see or observe the reconstructed, in particular three-dimensional, scene.

During the calculation of subholograms or encoding regions by the geometrical projection of the virtual visibility region onto the SLM, from any desired shape of the virtual visibility region, for example round, elliptical, hexagonal or a different shape, it is also possible to determine or generate subholograms in the respectively same shape. During the projection, rays are projected from the virtual visibility region through the object point onto the SLM. If the virtual visibility region is configured parallel to the SLM, or if there are two parallel planes, then the projection leads to a subhologram in the same shape as the shape of the virtual visibility region on the SLM. However, the case could also arise that, for example, the SLM may be configured to be tilted or curved in relation to the virtual visibility region. In this case, a different shape of the subhologram is also formed, which depends on the relative orientation of the two planes with respect to one another. In the case of an SLM which is tilted relative to the virtual visibility region, an elliptical subhologram would be for example formed in the case of a virtual visibility region which is circular in its shape, or a rectangular subhologram in the case of a square virtual visibility region. Because of the tilting of the SLM the subhologram is compressed in one direction. In general, the shape of the subhologram and that of the virtual visibility region need not therefore be the same.

Differences during the calculation of a subhologram between a wave propagation method, for example the Fourier transform method or Huygens' wavelets, and the projection method, which provides a geometrical calculation of the subhologram or encoding region, are however more strongly pronounced at the corners of a square or rectangular subhologram. An abrupt decrease of the amplitude from a value of 1 to a value of 0 (zero) at a corner of a subhologram would consequently also lead to stronger crosstalk with higher diffraction orders at the corner of a virtual visibility region. It may therefore be advantageous to use round or even elliptical subholograms and a round or elliptical virtual visibility region, and/or to generate encoding regions from angular subholograms on the SLM which are configured to be approximately round or elliptical in their shape.

During the already described calculation of the light propagation with a wave propagation method into a diffraction order and subsequent multiplication of the values obtained in this way by a function, the shape of the virtual visibility region may likewise be modified. For example, all the values of the virtual visibility region outside an established or predefined round region in the virtual visibility region may be set to a value of 0 (zero) in order to provide a round virtual visibility region. With this procedure, other shapes of the virtual visibility region may also be provided, for example elliptical or hexagonal, if this is suitable.

A continuously decreasing function, for example a Gaussian function, could also be used radially in the virtual visibility region in such a way that the amplitude decreases with the radius toward the edge of the virtual visibility region from the middle of the virtual visibility region. In such a case, a particularly strong attenuation of the amplitude relative to its value at the center would be obtained in the corners of the horizontal and vertical diffraction order.

The object according to the invention is furthermore achieved by a light modulation apparatus, by means of which the method according to the invention can be carried out and into which a hologram can be encoded according to this method.

Furthermore, the object according to the invention is also achieved by a display apparatus, or a display, in particular a holographic display, for representing a two- or three-dimensional scene. The display comprises at least one spatial light modulation device, the spatial light modulation device being suitable for carrying out the method according to the invention in order to encode as a hologram a scene to be reconstructed.

There are now various possibilities for advantageously configuring the teaching of the present invention, and/or for combining the above-described exemplary embodiments or configurations with one another. To this end, on the one hand, reference is to be made to the patent claims dependent on the independent patent claims, and on the other hand to the following explanation of the preferred exemplary embodiments of the invention with the aid of the drawings, in which preferred embodiments of the teaching are also generally explained. The invention will in this case be explained in principle with the aid of the exemplary embodiments described.

DETAILED DESCRIPTION OF THE INVENTION

It should briefly be mentioned that elements/parts/components which are the same also have the same references in the figures.

With the aid of FIGS. 2 to 5, a more detailed description will be given of the generation and calculation of encoding regions on the basis of subholograms on a spatial light modulation device (SLM) of a holographic display, in which the associated object points each have small distances with respect to the SLM.

Figure 1:
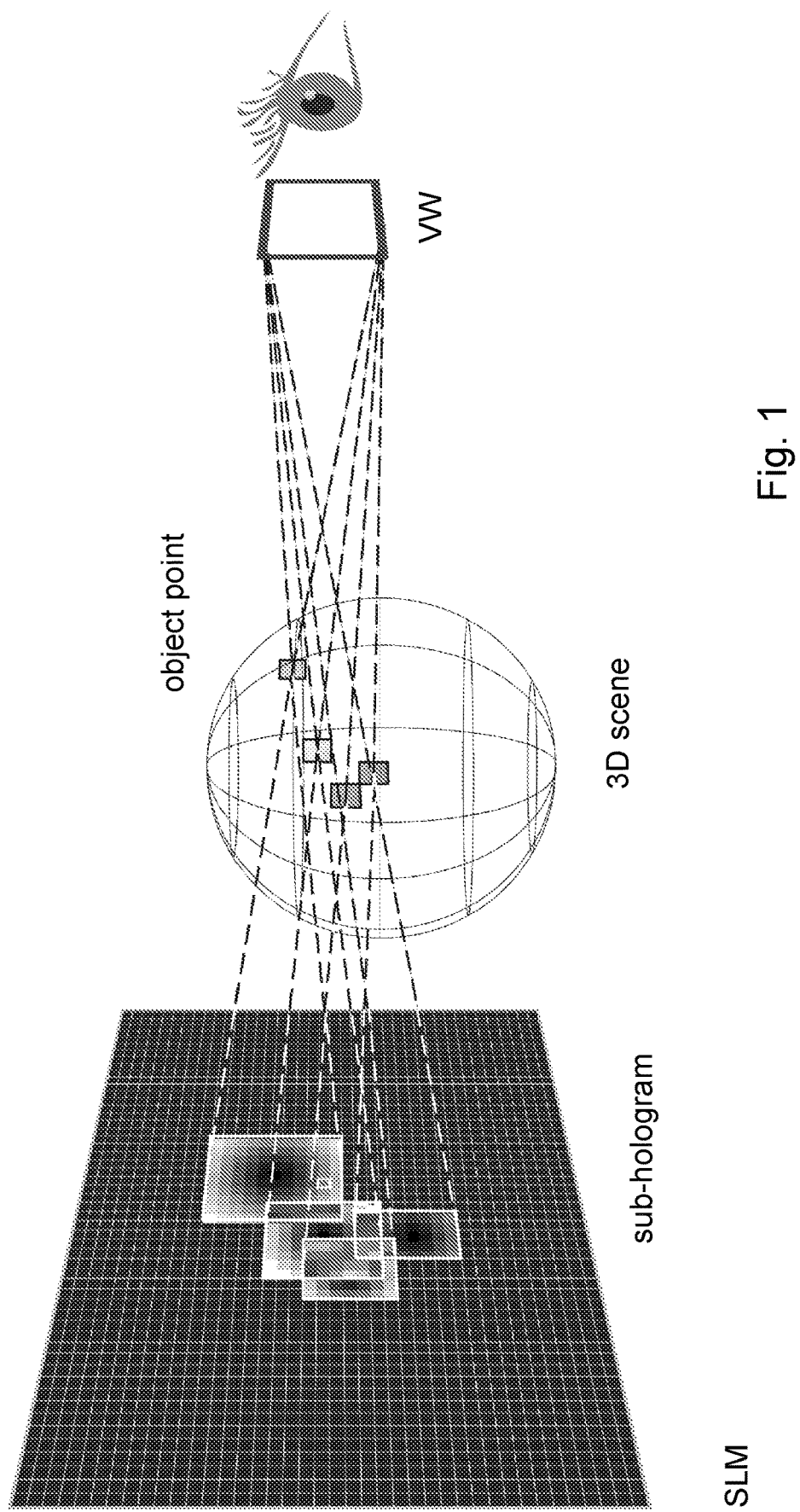
FIG. 1: shows a schematic representation of a holographic display apparatus, or a display, according to the prior art in a perspective representation.
Figure 2:
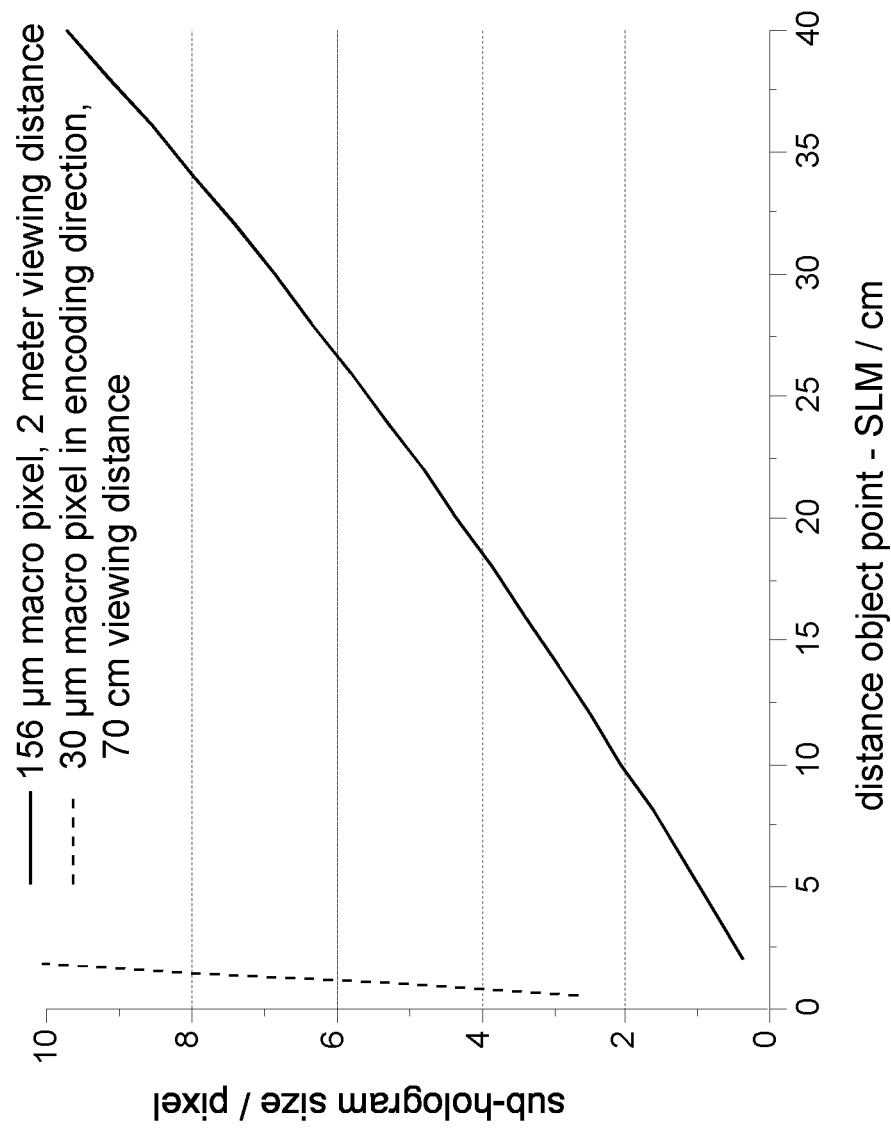
FIG. 2: shows a graphical representation of the size of a subhologram as a function of the distance of an object point with respect to the plane of a spatial light modulation device.

With respect to the size of a subhologram on the SLM by means of an analytical calculation or by means of the known or conventional projection method, for different types and sizes of an SLM, reference is made in general to FIG. 2 in which the size of the subhologram on the SLM is plotted in pixels against the distance of an object point of a scene to be reconstructed from the SLM. The solid curve shows subhologram sizes as a function of the object point distance with respect to the SLM for an SLM with a resolution of about five megapixels, a pixel pitch of 156 μm and with a distance of an observer with respect to the SLM, or display, of about 2 m. The dashed curve also represented shows subhologram sizes as a function of the object point distance with respect to the SLM for an SLM with an approximate pixel pitch of 30 μm and an approximate distance of an observer with respect to the SLM, or display, of 70 cm. The curves represented in FIG. 2 were calculated for light with a blue wavelength of $\lambda=475$ nm. For the subholograms of the solid curve, there is a virtual visibility region with a size of about 6 mm. For the subholograms of the dashed curve, there is a virtual visibility region with a size of about 11 mm.

As can be seen from the graphical representation according to FIG. 2, for the SLM of the solid curve, the size of the subholograms decreases to 4 pixels for object points which are about 18 cm in front of the SLM, or display, and further to 2 pixels for object points which are about 10 cm in front of the SLM, or display. For these subholograms which are very small in their size or extent on the SLM, however, a sufficiently good reconstruction is no longer achieved since the diffraction effects at the edges of the subholograms are more strongly pronounced for these subholograms than for subholograms which are large in their size or extent. Furthermore, it may be possible that crosstalk of higher diffraction orders takes place not only over the edge of the virtual visibility region, but also the entire width or extent of the virtual visibility region. The 18 cm distance in this case corresponds to 9% of the observer distance, and the 10 cm distance corresponds to 5% of the observer distance.

In particular for the SLM of the dashed curve, however, there is already a size of the subhologram of 5 pixels for a distance of the object point with respect to the SLM, or display, of about 1 cm—in this case only about 1.4% of the observer distance. Thus, the relevant depth region is then very small.

It is furthermore to be mentioned that object points, or a scene to be reconstructed, may be generated or represented in front of the display, behind the display, or even in the plane of the display, as seen in the viewing direction of an observer at the display. The plane of the display is usually the plane of the SLM. Object points which lie in the plane of the SLM would expediently, and for simpler calculation, always be one pixel in size, even if the limit value of the size of the subholograms in the analytical calculation, or in the calculation with the projection method, tends toward a value of 0 (zero) there. The size or extent of the subhologram of one pixel rather corresponds to the fact that object points in the plane of the SLM are represented such as on a two-dimensional (2D) SLM.

Figure 3:
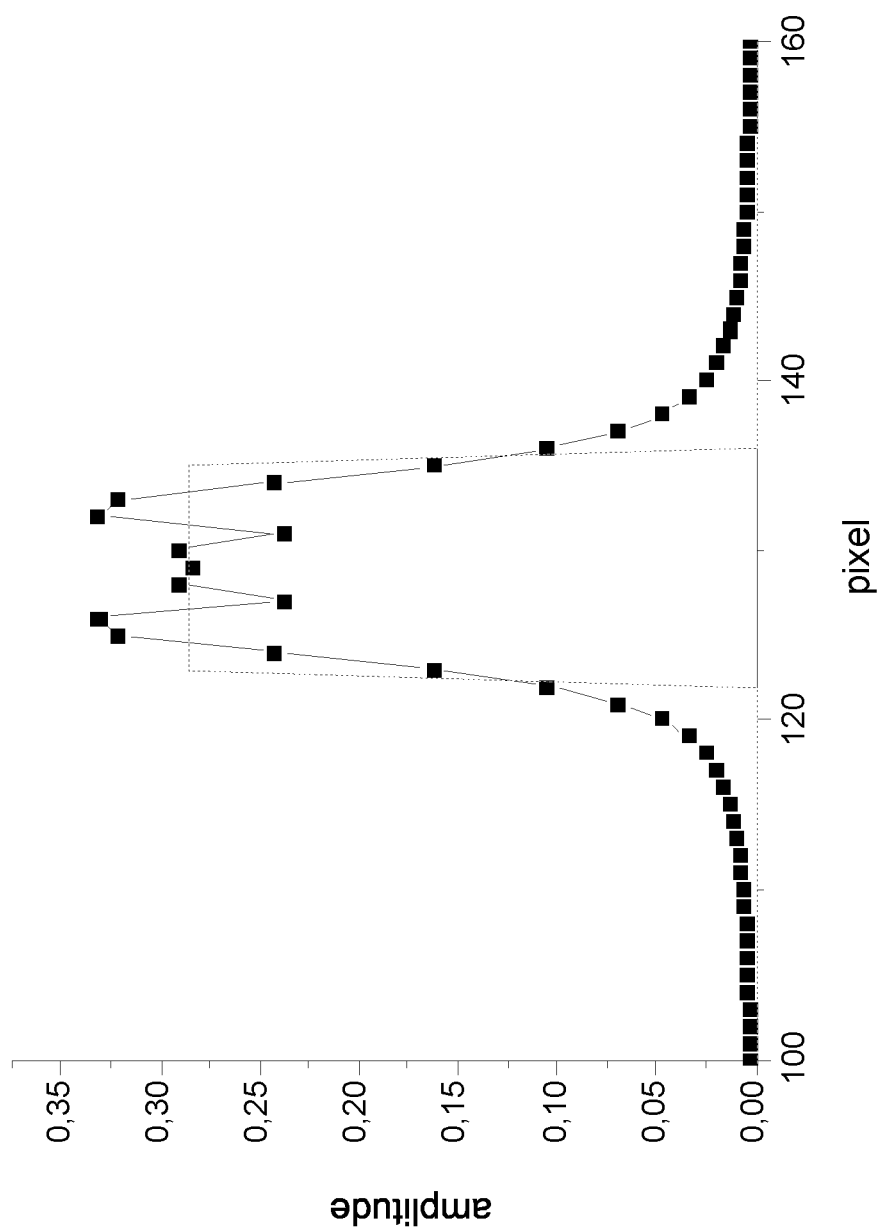
FIG. 3: shows a graphical representation of an amplitude in the subhologram according to a calculation with the projection method and with the Fourier transform method.

With respect to differences in the calculation of a subhologram by means of the analytical calculation (calculation by means of the projection method) and the Fourier transform calculation, FIG. 3 shows an amplitude profile in a subhologram.

The solid curve shows the amplitude determined in the subhologram according to the geometrical calculation by means of the projection method, while the dash-dotted curve represents the amplitude determined according to the more exact calculation by means of the Fourier transform method for an SLM according to the solid curve according to FIG. 2, i.e. for a display which has an SLM with a pixel pitch of 156 μm and an observer distance of 2 m, the object point assigned to this subhologram being located about 50 cm in front of the display, or SLM. The amplitude of the subhologram determined with the analytical calculation of the solid curve according to FIG. 3 was in this case adapted to the average level of the amplitude of the subhologram determined or calculated with the Fourier transform method in order to allow simpler comparison. The geometrical calculation of the subhologram by means of projection in this case generates a subhologram having a size of 13 pixels.

The amplitude calculated with the Fourier transform method, which is represented by the dash-dotted curve, in this case shows a smoother profile with overshoots in the central region of the curve and a constant decrease outward or toward the edge region of the curve.

Such differences in the amplitude profile decrease with a larger virtual visibility region. For the SLM with a pixel pitch of 156 μm and for an observer distance of 2 m, for example, for blue light with a wavelength $\lambda=470$ nm the virtual visibility region is approximately 6 mm large.

Figure 4:
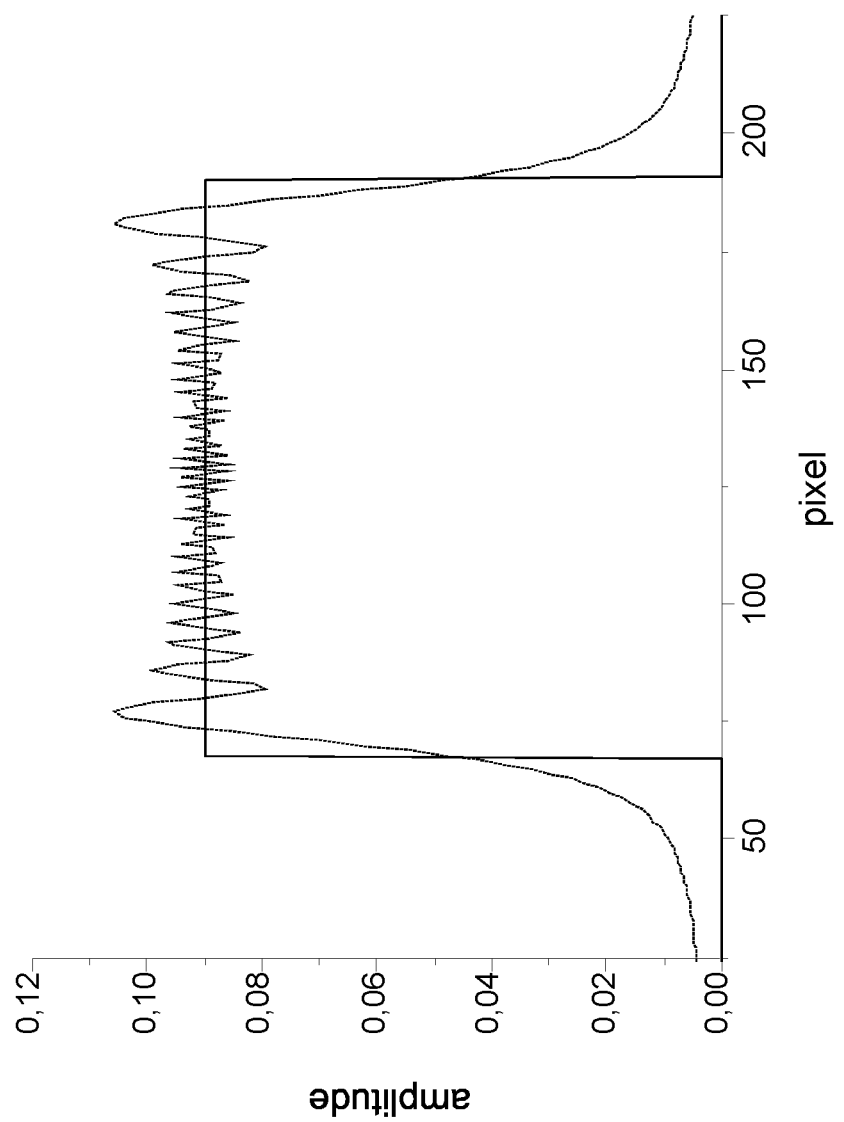
FIG. 4: shows a graphical representation of the amplitude profile in a subhologram according to FIG. 3, an object point being located approximately 17.5 cm in front of the plane of the spatial light modulation device, in the viewing direction at the spatial light modulation device, FIGS. 5a/b: show graphical representations of the amplitude profile for a spatial light modulation device according to the solid curve according to FIG. 2 for an object point which is located approximately 10 cm in front of the spatial light modulation device, in the viewing direction at the spatial light modulation device.

FIG. 4 represents the amplitude profile according to FIG. 3, but for an object point which is located only about 17.5 cm in front of the display and for an SLM according to the dashed curve according to FIG. 2, and therefore for a display which has an SLM with a 30 μm pixel pitch and an observer distance of 70 cm. This means that for the SLM according to the dashed curve according to FIG. 2 and an object point which is located about 17.5 cm in front of the display or the SLM, according to FIG. 4 the solid curve would show an amplitude profile according to the geometrical calculation with the projection method and the dashed curve would show an amplitude profile according to the calculation with the Fourier transform method. In both cases, object point distance 50 cm and observer distance 2 m as shown in FIG. 3, or object point distance 17.5 cm and observer distance 70 cm as shown in FIG. 4, the relative distance of the object point with respect to the SLM is 25% of the observer distance. In the latter case, 30 μm pixel pitch and observer distance of 70 cm, however, the virtual visibility region for blue light with a wavelength of $\lambda=470$ nm is about 11 mm large, i.e. about 1.8 times as large as in the example selected in FIG. 3.

As can be seen in FIG. 4 in comparison with FIG. 3, the overshoots of the amplitude profile of the dashed curve become much less at least in the central region of the subhologram. Comparison between FIGS. 3 and 4 shows that for the larger virtual visibility region with a size of 11 mm and the same relative distance with respect to the SLM of 25% of the observer distance the differences between subholograms which have been calculated with the projection method and subholograms which have been calculated with the Fourier transform method are much less than for a virtual visibility region with a size of only 6 mm.

Figure 5A:
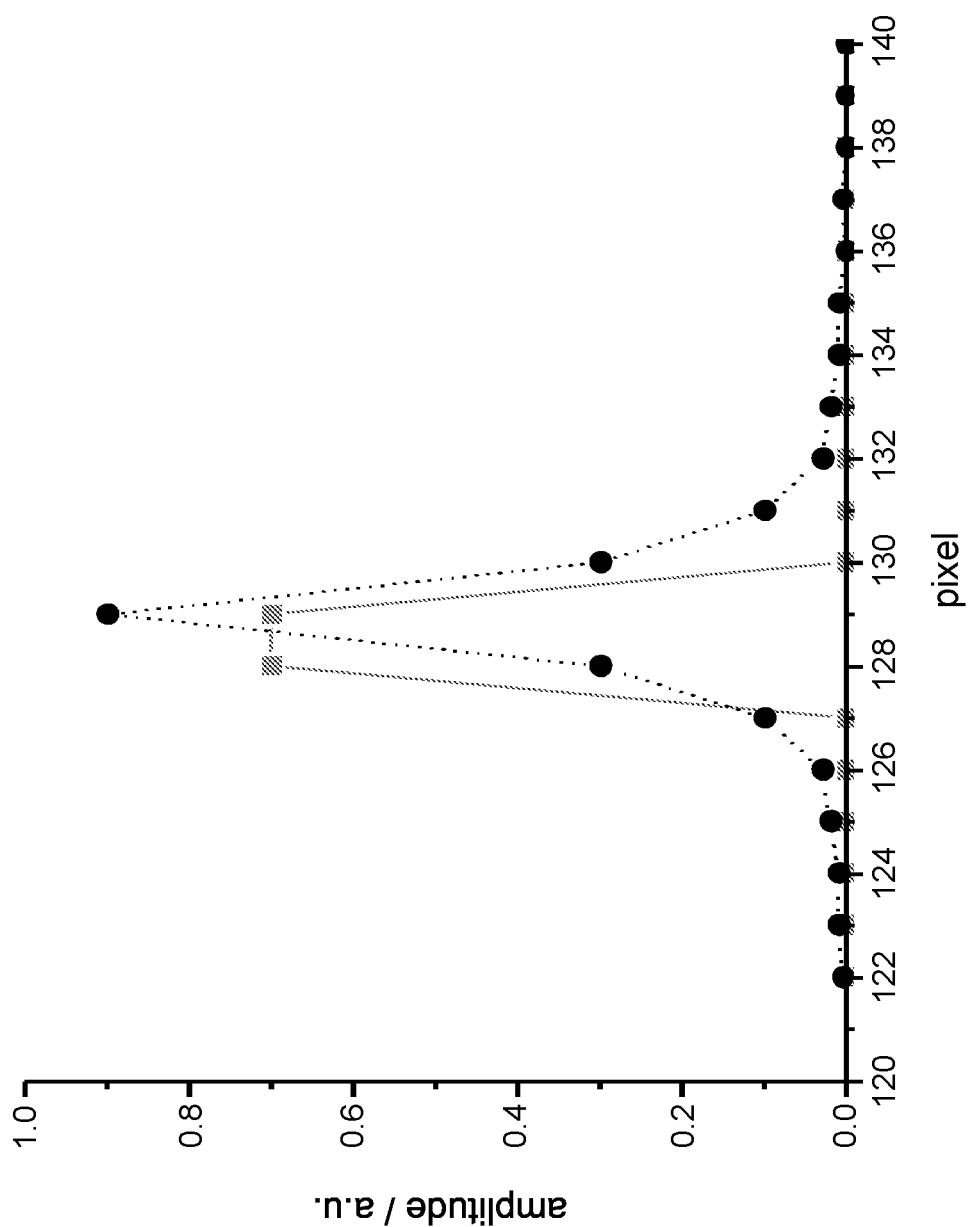

For an SLM according to the solid curve according to FIG. 2—for the case with a virtual visibility region with a size of 6 mm—FIG. 5a shows an amplitude profile for a subhologram which is generated and calculated by an object point which is located about 10 cm—or 5% of the observer distance—in front of the display or SLM—i.e. closer than the object points considered previously. According to the geometrical calculation of a subhologram with the projection method, the subhologram is then only 2 pixels wide in its size or extent. Only 2 pixels have amplitude values not equal to 0 (zero), and these two amplitudes are equally large. The subhologram determined with the Fourier transform method, however, shows a symmetrical profile over a respectively odd number of pixels of the subhologram determined. Only a central pixel has a high amplitude the left and right neighbors of this pixel having a much lower amplitude. The relative differences of the two calculations of the subhologram would thus be particularly large in this case, as can be seen clearly from the shift of the two curves relative to one another. In the calculation with the projection method, the middle of the subhologram lay between two pixels. In the calculation with the Fourier transform method, the middle of the subhologram also corresponds to the middle of a pixel.

From FIGS. 2 to 5a, it can thus be inferred that the analytical calculation of the subhologram by means of the projection method is advantageously modified for subholograms which are very small in their size or extent, for example in this case for a virtual visibility region with a size of 6 mm and a relative distance of the object points with respect to the display or SLM of 10% of the observer distance, in such a way that the amplitude profile of the subhologram is approximated to the amplitudes of the subhologram determined with the Fourier transform method, by allowing different amplitudes of the individual pixels of the subhologram, or the individual pixels having different amplitudes.

For example, for this distance of an object point from the display or SLM according to FIG. 5a and similar distances, now instead of 2 pixels with the same amplitude, the subhologram is widened to 3 (5 or more) pixels in its extent, and an encoding region on the SLM is therefore provided which has the subhologram determined by means of the projection method and further pixels adjacent thereto. The amplitudes for this encoding region are in this case, for example, taken from the calculation values which were obtained by means of the Fourier transform method.

FIG. 5b shows a subhologram having 5 pixels, the amplitude values of these 5 pixels corresponding to the calculation with the Fourier transform method. As comparison with FIG. 5a shows the Fourier transform method still has small nonzero amplitude values for further pixels. The subhologram with 5 pixels in FIG. 5b, however, represents an already very good approximation to the result of the Fourier transform method.

In this case, depending on additional computational effort, it may be advantageous for the amplitudes for such small distances of object points with respect to the display or SLM to be stored in a value table, also referred to as a look-up table. Since the amplitudes in the present example are symmetrical with respect to the middle of the subhologram, it would be sufficient to store 3 amplitude values in a look-up table.

An encoding region need not, however, be determined exactly with the aid of the values from the Fourier transform method.

Figure 6:
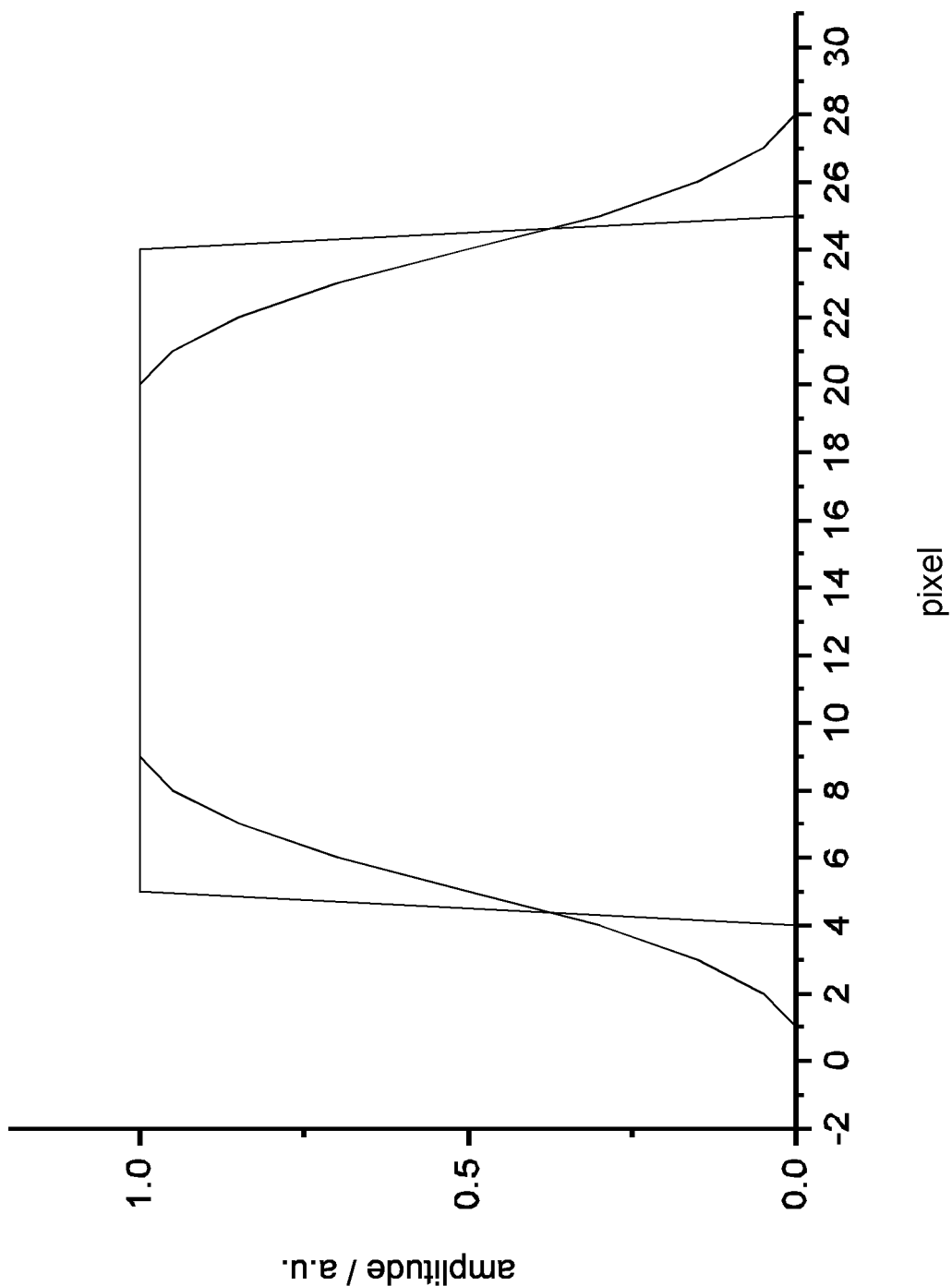
FIG. 6: shows a graphical representation of the amplitude profile in the subhologram according to a calculation with the projection method with an abrupt transition of the amplitude, and an amplitude profile according to the invention with a constant transition.

FIG. 6 shows a graphical representation of the amplitude profile in the subhologram according to a calculation with the projection method with an abrupt transition of the amplitude and, in comparison therewith, an amplitude profile in an encoding region with a constant transition of the amplitudes from a value of 0 to a value of 1. The amplitude profile in the encoding region was determined from the subhologram by the amplitude being slightly reduced for respectively 4 edge pixels of the subhologram, for example to values of 0.95, 0.85, 0.7 and 0.5 and the amplitude being slightly increased for respectively 3 pixels outside the extent of the subhologram, for example to a value of 0.3, 0.15 and 0.05. An encoding region, which has the subhologram determined by means of the projection method and further pixels adjacent thereto, was thus provided on the SLM. The effort of computation with the Fourier transform method is, however, not necessary in this case.

The method according to the invention of calculating and generating a hologram on an SLM will be described in more detail below.

The region of the encoding of object points on an SLM may, according to the invention, be extended to a region outside the subhologram. In this case, the method with which the subhologram is generated and calculated is largely unimportant.

In simulations, a diffraction pattern of an individual pixel, apodized cosinusoidally in the transmission, of the SLM used was calculated in the plane of an entrance pupil of an observer's eye. In this case, it was apparent that the region of the diffraction pattern of an individual pixel, or the region of the intensity distribution in the far field of the pixel, i.e. specifically in the plane of the entrance pupil of an observer's eye, with an intensity value of $I>0.9\times I_{max}$ in a first lateral extent (y direction) assumes a value of more than 7 mm and in a second lateral extent (x direction) has a value of more than 20 mm, a pixel having an aspect ratio of 1:3. This means that the subhologram could be widened or extended in the y direction for example by ±3.5 mm and in the x direction for example by ±10 mm in its size. Exclusively this region lying outside the conventional subhologram could also be used for encoding an object point. This means that the diffraction patterns of the neighboring pixels in this region, i.e. also the pixels lying in this region but lying outside the conventional subhologram, also reaches the entrance pupil of the observer's eye and leads to an object point, which does not lie in the region of the subhologram determined by the geometrical projection, being represented on the retina of the eye.

On the basis of these simulations it can be inferred that the diffraction pattern of an individual pixel of the SLM in the plane of the entrance pupil of the eye is significantly more extended than the entrance pupil itself. Conversely, this also means that pixels of the SLM outside the area of the geometrical projection of the entrance pupil of the eye or of the virtual visibility region through an object point onto the SLM may be used in order to generate the desired object points in space, and in order to be able to acquire them by the entrance pupil of the eye. The pixels of the SLM which are used in order to encode an object point in space may therefore partially, or even in particular cases fully, lie outside the projection area of the entrance pupil of the eye or of the projection area of the virtual visibility region on the SLM. Furthermore, it is also possible for the area of the subhologram to be variably thinned, that is to say only particular pixels in the subhologram are employed for encoding the object point.

In the case of a variable thinning, optimization may be carried out on the remaining, i.e. the addressed and unmasked pixels of the SLM, in order to achieve best possible suppression of the background.

By the addressing of pixels over the spatial extent of the conventional subhologram, the number of pixels used for the reconstruction can be increased or else reduced. The addressing of the pixels may also be carried out in a statistically thinned manner and, with a sufficiently large starting number of pixels, may for example be reduced to 80%, 60%, 40% or even 20% of the initial pixels, which in a comparable conventional subhologram may be addressed, or assigned to one or more object points. This is dependent on the individual encoding case.

The removal of the conventional structuring of the subhologram may also be deliberately used to make the spatial frequency components of the diffraction patterns of individual neighboring object points differ from one another in such a way that their superposition, manifested in the form of visible crosstalk, is reduced. The starting point may, for example, in this case be a conventional subhologram to which an amplitude apodization function is applied in order to achieve an encoding region for an object point. This amplitude apodization function differs from the amplitude apodization function of the neighboring subholograms or encoding regions, which encode object points neighboring the first object point, which is encoded by the first encoding region. It is, however, also possible to use as a basis a statistical distribution of the addressing of pixels, which carries this out. The encoding regions may also overlap. It is, however, also possible that the encoding regions do not need to overlap, for example when the pixel number on the SLM is high enough and/or sufficiently existing statistical thinning of the pixels makes it possible to use albeit statistically thinned but nonoverlapping pixel groupings, i.e. different pixel groupings for different object points, these pixel groupings not overlapping, or overlapping only slightly. The different amplitude apodization functions, used for different object points, of the subholograms or encoding regions should in this case not be symmetrical. This is not dependent on whether or not the subholograms are statistically thinned.

In other words, and for better understanding, a diffraction pattern of an individual pixel may be considered in a similar way to an Airy distribution. The height and position of the side lobes in the diffraction pattern are dependent on the amplitude apodization function used for the subhologram. Thus, the side lobes can in general be brought closer to the central peak by a higher numerical aperture, and moved away from it by a smaller numerical aperture. By the approach of using a multiaperture lens, or in general statistically thinned or statistically apodized lens functions in the subhologram, it is possible to shift the side lobes into the background of the diffraction pattern or to modify their position and shape in relation to neighboring diffraction patterns in such a way that crosstalk of neighboring object points becomes minimal. As an evaluation criterion, the image formed on the retina is in this case used. This means that the compression of the angular spectrum of plane waves of the light by the entrance pupil of an observer's eye is to be taken into account.

Sets of amplitude apodization functions of subholograms may be saved with correspondingly produced values of the mutual crosstalk in look-up tables and stored. Simple values are obtained by a convolution, in which case it should be noted that the convolution center is determined by the mutual distance of the assigned object points. In other words, this gives an optimization approach for the reconstruction quality of represented object points perceived by the observer.

Figure 7:
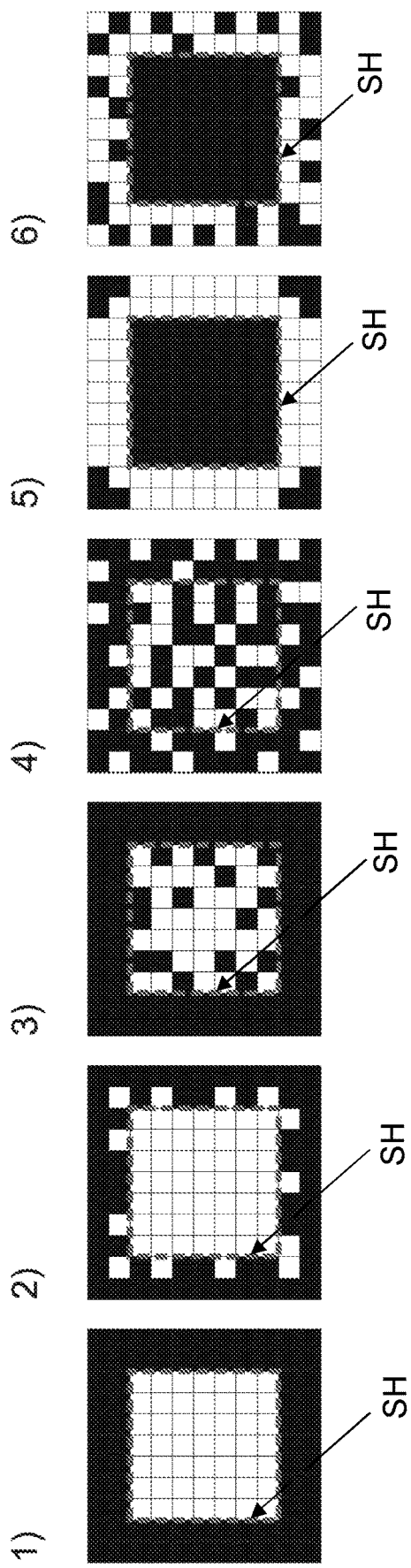
FIG. 7: shows schematic representations of intensity distributions, or addressed pixels, on the spatial light modulation device, the individual representations 1) to 6) showing various possibilities of an increase or reduction of the area of a subhologram.

FIG. 7 shows different types of the addressing of pixels on the SLM. These types of addressing may be used in order to reconstruct object points of a two-dimensional and/or three-dimensional scene with a particular number of pixels, the reconstruction being acquirable by the entrance pupil of an eye of an observer observing the scene. In general, a statistical selection or statistical thinning of a subhologram or encoding region may be carried out in a complex-valued fashion, i.e. with respect to the amplitude transparency and the phase transparency of the pixels. The representations in FIG. 6 may in general show an address grid of complex-valued pixels, but also simply an intensity grid or an array of intensity values, which may for example be binary or else take values of between 0 and 1. The use of a binary grid of the addressing or simply of the intensity distribution serves to simplify the representation. Grids of the—weighted—addressing and also grids of the intensity may extend continuously.

In FIG. 7, representation 1) shows an intensity distribution or addressed pixels of a subhologram SH, the subhologram SH having the same size or extent in each representation 1) to 6). The region of the subhologram SH is shown by means of a dashed line or outline.

Representation 2) shows a statistical extension of the addressed pixels or of the subhologram SH to pixels which lie outside the subhologram SH. In other words, the subhologram has been increased in its size or extent by providing pixels lying outside it, which likewise contribute to the encoding of an object point in the SLM, to form an encoding region. The encoding region generated in this way therefore comprises the subhologram SH, all pixels of the subhologram SH, and further pixels of the SLM which lie outside the subhologram SH, here illustrated as white. In this case, in representation 2), only isolated pixels lying in the edge region of the subhologram SH, which in addition to the subhologram SH contribute to the generation of the encoding region, are shown. It is of course also possible that the subhologram SH may be increased in its size or extent in order to generate an encoding region in such a way that all pixels lying around the edge region of the subhologram SH may be used for the encoding of an object point, i.e. statistical thinning of the pixel extension lying outside the subhologram is not provided. For example, the subhologram SH may be extended in the upper, lower, left and right region by 3 or even 5 pixels, in which case the amplitudes of these pixels and pixels at the inner edge region of the subhologram are then assigned corresponding amplitude values so that a constantly decreasing amplitude profile is provided toward the edge region of the encoding region.

In representation 3), statistical masking of the addressing of pixels inside a subhologram SH is shown. As can be seen, individual pixels, here illustrated as black, do not contribute to the encoding of an object point in the SLM.

Statistical addressing of pixels inside and outside a subhologram SH is shown in representation 4) of FIG. 6. This illustration shows that both pixels in the subhologram may be reduced and, at the same time, the subhologram may be extended by pixels outside it. The encoding region for an object point therefore comprises the subhologram thinned by pixels and the pixels, here illustrated as white, lying outside the subhologram.

Representation 5) shows addressing, which is not statistically thinned, of pixels fully outside a subhologram SH. As can be seen, no pixels which encode an object point in the SLM lie inside the subhologram SH. In this embodiment, the pixels which encode the object point in the SLM lie fully outside the area of the subhologram SH.

In contrast to representation 5), representation 6) likewise shows addressing of pixels which lies fully outside a subhologram, but in this case there is statistically thinned addressing of the pixels outside the subhologram SH. In this embodiment as well, as in the embodiment of representation 5), no pixels which encode an object point in the SLM lie inside the subhologram SH. In this embodiment, the pixels which encode the object point in the SLM lie fully outside the area of the subhologram SH, and specifically in this case only particular statistically determined pixels are provided for encoding the object point.

Figure 8:
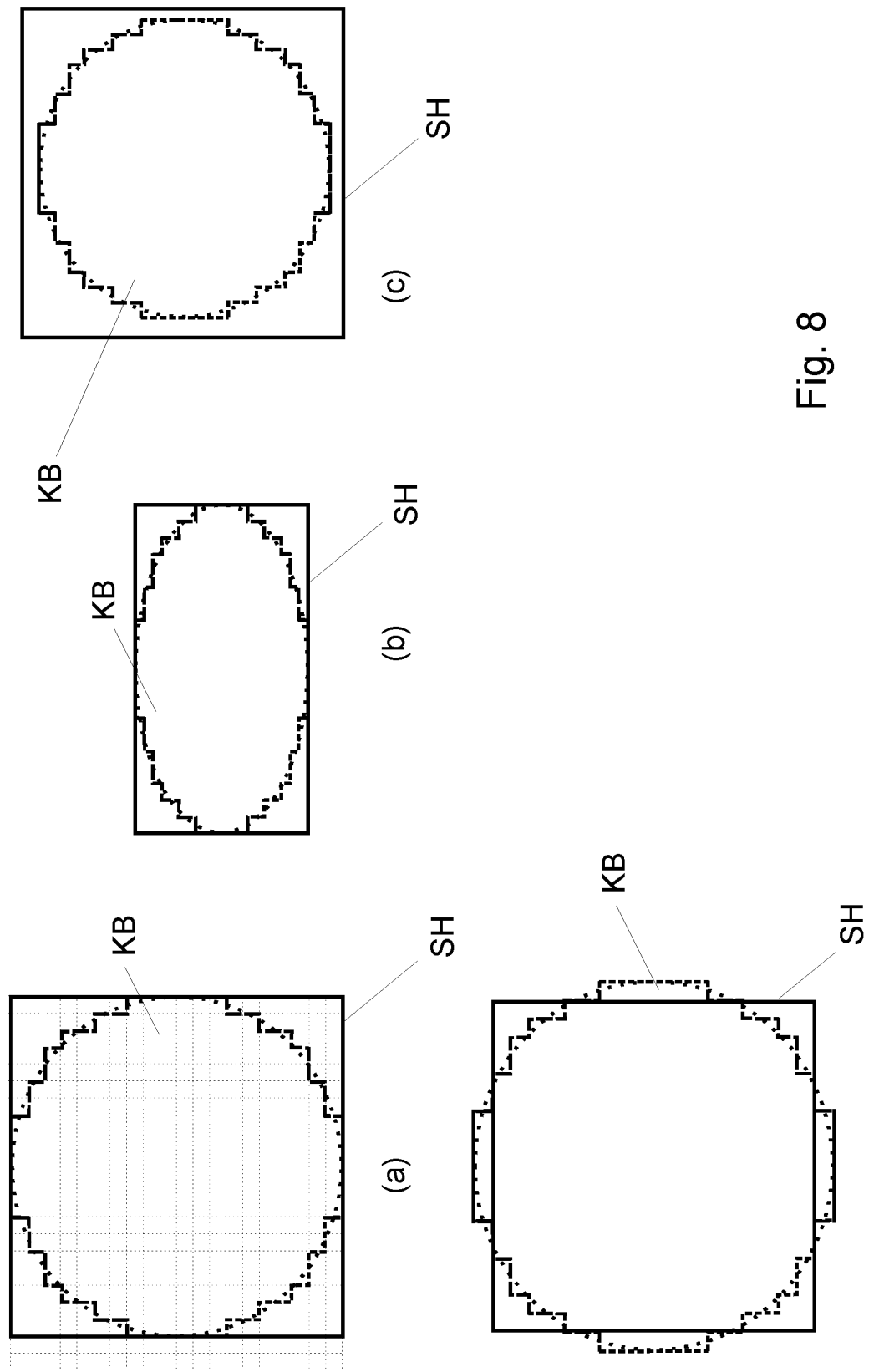
FIG. 8: shows a graphical representation of a rounded encoding region according to the invention.

FIG. 8 shows rounded encoding regions KB in conjunction with rectangular or square subholograms SH assigned to the encoding regions KB in representations a) to d).

Representation a) of FIG. 8 shows an example of an encoding region KB which is smaller than the subhologram SH that is obtained from a calculation with the projection method. Schematically shown is an SLM with, in this example, square pixels which are intended to be represented by the gray lines inside the subhologram SH. The subhologram which is calculated by means of the projection method for an object point and is represented by the solid line is, in this example, likewise square and 20×20 pixels in size.

As shown in FIG. 4 with the aid of a section through a subhologram, in the case of larger subholograms there are also differences in the edge region of the subholograms between the calculation with the Fourier transform method and with the projection method—particularly in the graphical representation of FIG. 4, in which the amplitude profile of the Fourier transform method (black curve) has overshoots, but the amplitude profile of the subhologram calculated with the projection method has a constant amplitude.

In two dimensions, in a subhologram configured to be rectangular or square, these differences between the subholograms calculated with the projection method and with the Fourier transform method are particularly large in the corner regions of the subhologram, because here overshoots of the horizontal and vertical amplitude profiles are added together. Simpler calculation of a subhologram with the projection method may generate crosstalk due to higher diffraction orders in the corners. Such perturbing crosstalk may, however, advantageously be reduced when an encoding region is selected which is smaller in its size than the region of the subhologram area calculated by means of the projection method.

In particular, it may be advantageous to select an approximately rounded shape of a subhologram. In the example shown in FIG. 8, the encoding region KB is selected in such a way that a circle is defined with a diameter which corresponds to the edge length of the square subhologram SH, shown here by the dotted line.

Inside the pixel grid, pixels are then selected as associated with the encoding region in such a way that they approximate this circular shape, shown here by the dashed line.

According to representation b) of FIG. 8, a rectangular subhologram SH may in a similar way be replaced with an approximately elliptical encoding region KB, by calculating an ellipse whose major and minor axes correspond to the long and short edge lengths of the rectangle of the subhologram SH.

The invention is not, however, restricted to this case. In general, the diameter of the circle or the axes of the ellipse for the encoding region may also differ from the edge lengths of the subhologram.

The circle diameter or the axes of the ellipse for the encoding region may accordingly also be smaller according to representation c) of FIG. 8 or slightly larger according to representation d) of FIG. 8 than the subhologram. As shown by representation d) of FIG. 8, an encoding region KB could for example be formed or generated in such a way that it is slightly larger than the subhologram SH in the horizontal direction and in the vertical direction, but smaller in the diagonal direction.

Figure 9:
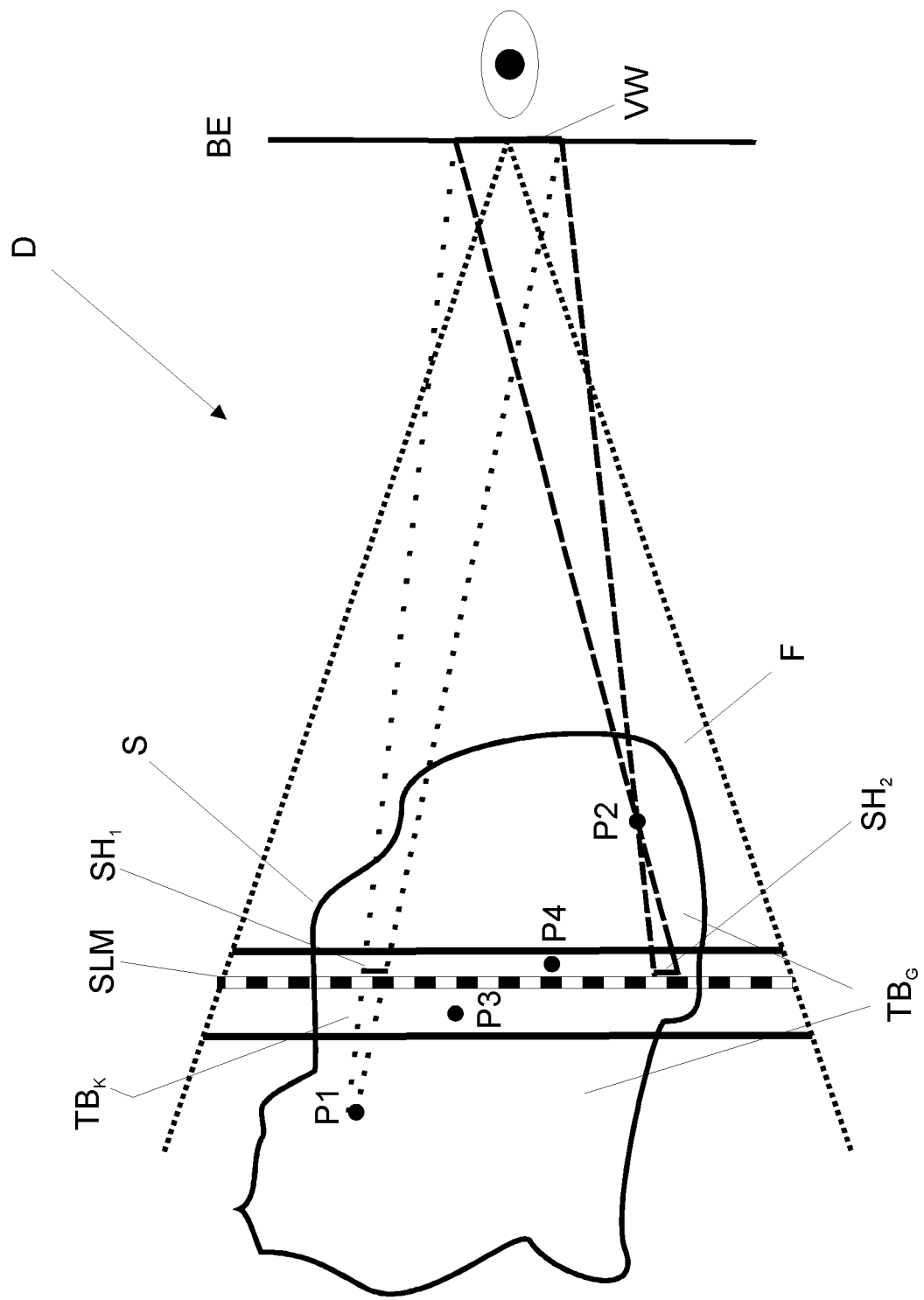
FIG. 9: shows a schematic representation of the subdivision of a scene to be reconstructed in depth regions for the calculation of encoding regions on a spatial light modulation device.

Subdivision of a three-dimensional scene S to be reconstructed into depth regions $TB_G$ for calculation of encoding regions KB from subholograms SH with the projection method and other depth regions $TB_K$ for calculation of encoding regions KB from subholograms SH with the Fourier transform method is shown schematically in FIG. 9.

FIG. 9 in this case schematically shows a display D comprising an SLM and a virtual visibility region VW, which may in this case also be referred to as a virtual observer window, through which an observer, shown here by an observer's eye, can observe the reconstructed scene S. The three-dimensional scene S to be reconstructed can be represented in a frustum F, a so-called observer region, which is spanned from the virtual visibility region VW to the SLM, in which case the frustum F may extend backward beyond the SLM, as indicated. The three-dimensional scene S is decomposed into object points Pn. Here, by way of example, the object points P1 to P4 of the three-dimensional scene S are shown. The object points P1 and P3 lie behind the SLM as seen from an observer plane BE. The object points P2 and P4 therefore lie in front of the SLM. As can be seen from FIG. 9, the object points P1 and P2 have larger distances with respect to the SLM than the object points P3 and P4.

The three-dimensional scene S is in this case divided into a depth region $TB_G$ with a larger distance from the SLM, both in front of and behind the SLM, in which for example the object points P1 and P2 lie, and into a depth region $TB_K$ close to the SLM. This is indicated in FIG. 9 by the two thick vertical lines, which are intended to represent the separation planes. For example, the object points P3 and P4 lie in the depth region $TB_K$ close to the SLM. As indicated in FIG. 9, the expression "close to the SLM" may in general mean a different absolute distance in front of the SLM than behind the SLM. For example, the region may be defined by a minimum size of the subhologram in pixels. The depth region $TB_K$ close to the SLM may, for example, be defined in such a way that this depth region $TB_K$ comprises subholograms SH having a horizontal or vertical extent of less than 5 pixels. The 5 pixel extent of the subholograms is generally achieved at a larger distance behind the SLM than in front of the SLM, as seen from the observer plane BE.

For the object points P1 and P2, which are further away from the SLM than the object points P3 and P4 and lie in the depth region $TB_G$, in this configuration subholograms $SH_1$ and $SH_2$ are calculated according to the projection method. For the object points P3 and P4 which have a short distance with respect to the SLM and lie in the depth region $TB_K$, subholograms SH are calculated according to the Fourier transform method. The encoding regions on the SLM are respectively determined and generated from these subholograms SH, $SH_N$ for the respective object points $P_N$.

In an alternative configuration, precalculated values may also be taken from a look-up table for the encoding regions of the object points P3 and P4.

Figure 10:
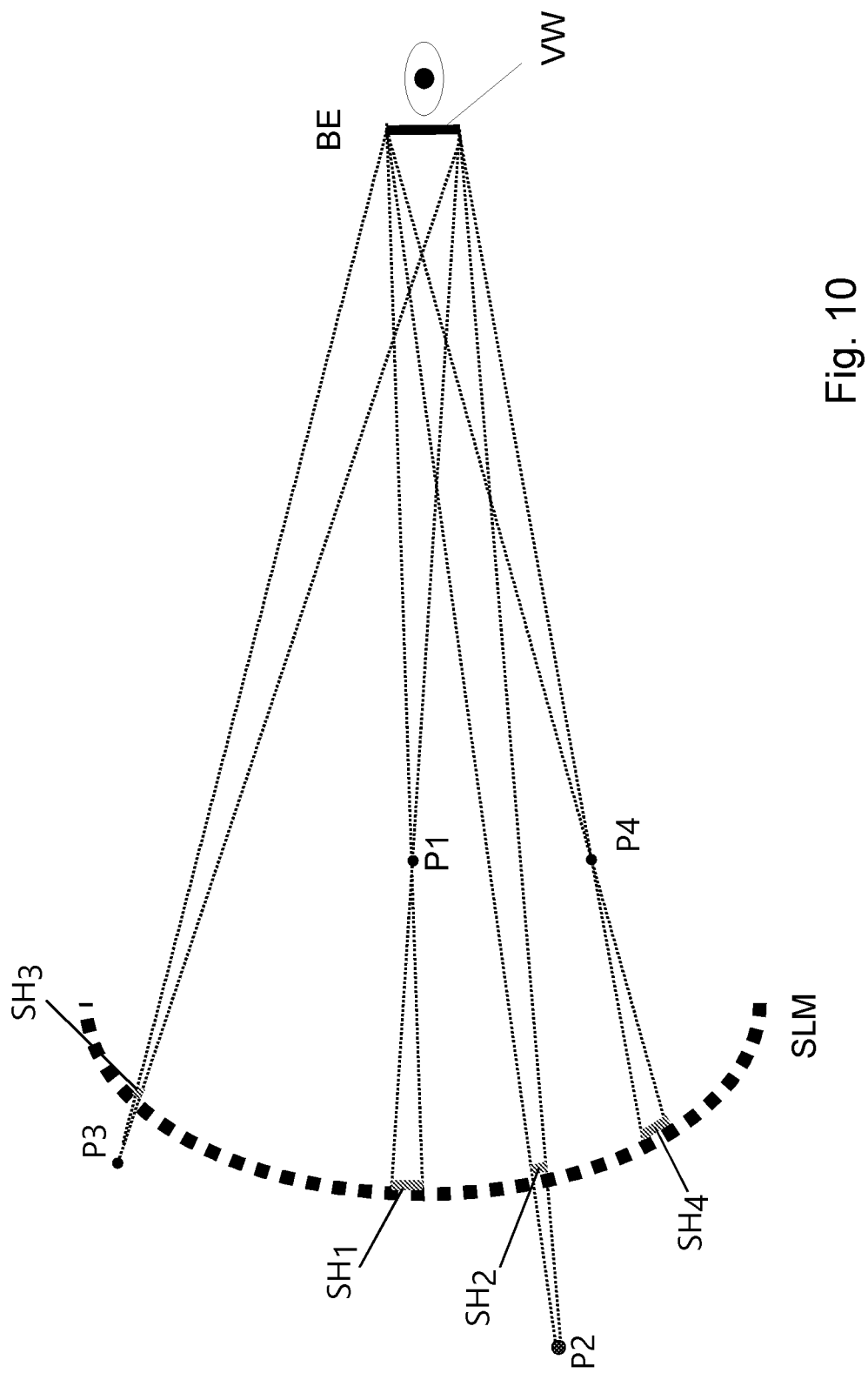
FIG. 10: shows a schematic representation of the calculation of encoding regions on a curved surface of a spatial light modulation device.

FIG. 10 schematically represents the way in which the encoding regions on a curved or bent surface of an SLM can be calculated. In this case, the object points P1 to P4 are again shown, which are in front of or behind the SLM as seen from the observer plane BE. The curved surface of the SLM may be a display which itself has a bent shape. In the context of this description, it may however also be an image of an SLM, for example in a head-up display, which assumes a bent shape because of aberrations of an imaging system provided therein, for example because of field of curvature, even though the physical SLM itself is configured to be flat.

For calculation with the projection method, the position and size of the subhologram on the curved SLM may be determined in a similar way as a flat SLM by tracing rays from the virtual visibility region VW through the object point $P_N$ to the SLM. This is shown schematically in FIG. 10 for the object points P1 to P4 and the associated subholograms $SH_1$ to $SH_4$. From the subholograms $SH_1$ to $SH_4$, associated encoding regions are then calculated in which the object points P1 to P4 are encoded on the SLM. If it is the case that the encoding region for an object point has the same size or extent and the same shape as the associated subhologram, then in FIG. 10 as well as in FIGS. 9, 11a and 11b the subhologram shown also represents the encoding region.

The phase profile in the subhologram may be determined from the path differences of the rays from the object point to the centers of the various pixels inside the subhologram. From this, an encoding region may then be determined in which the amplitude profile inside the encoding region is selected to be constant and constantly decreasing toward the edge region of the encoding region.

As an alternative, Huygens' wave propagation from the object point to the SLM may be carried out with the sampling respectively of one value per pixel on the SLM. The phase profile then essentially corresponds to the preceding procedure. The amplitude profile is likewise calculated from the wave propagation.

As an alternative, Huygens' wave propagation from the object point to the virtual visibility region and further Huygens' wave propagation from the virtual visibility region to the SLM are also possible.

Figure 11A:
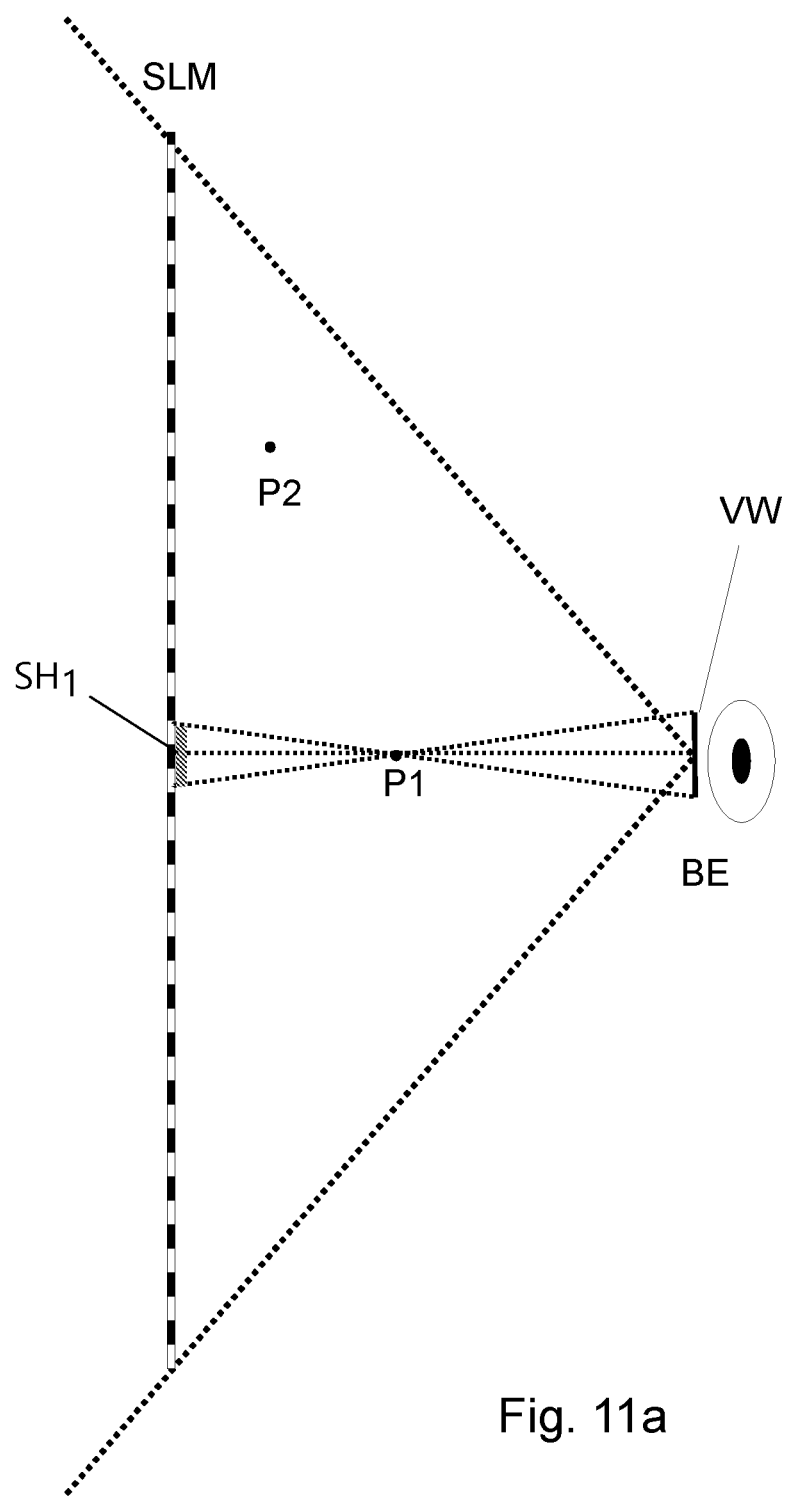
FIGS. 11a,11b: each show a schematic representation of a display with a very large field of view.
Figure 11B:
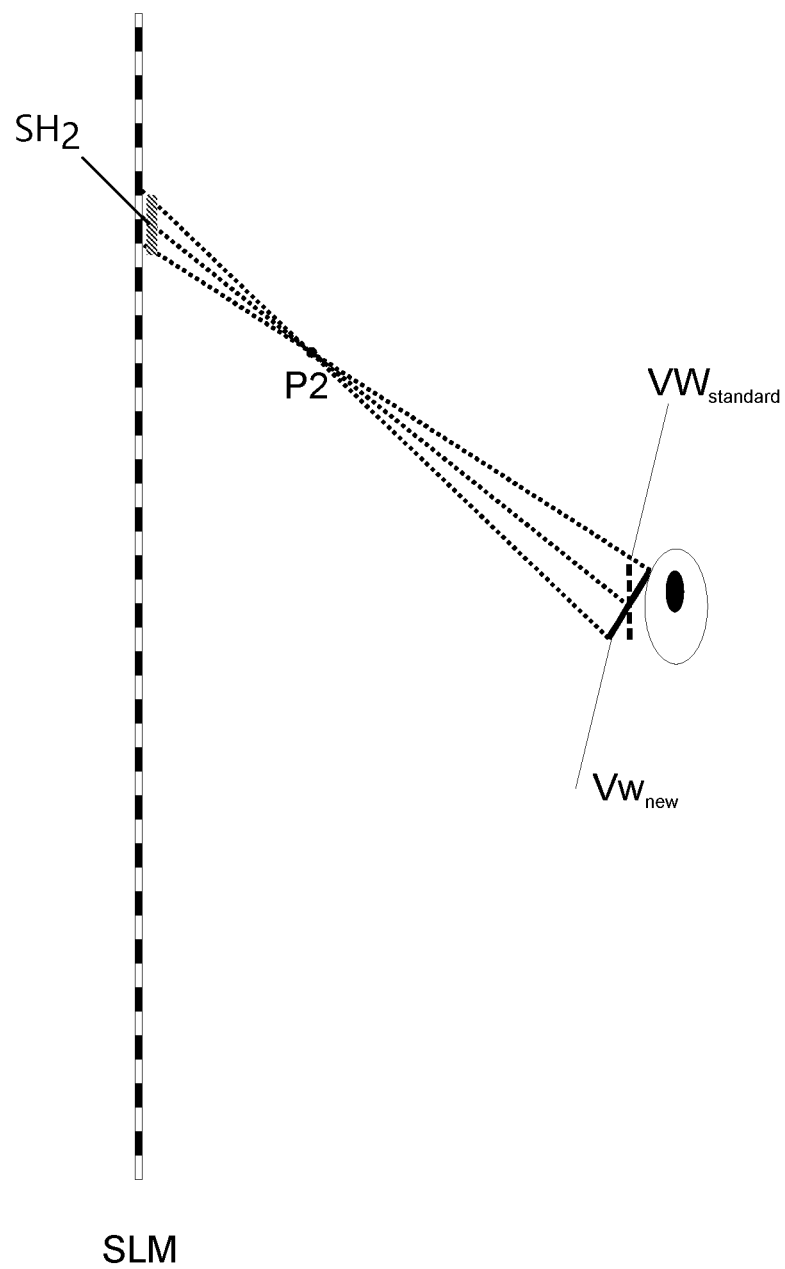

FIGS. 11a and 11b respectively show a display or an SLM having a very large field of view. In these examples, the field of view is approximately 100 degrees and is shown by the dashed outer lines.

In FIG. 11a, an observer's eye is located in the central region or centrally in front of the SLM and looks through the virtual visibility region VW perpendicularly at the SLM, and likewise perpendicularly at an object point P1. For this object point P1, a subhologram $SH_1$ is calculated, and an encoding region is calculated therefrom, as would also be the case for an SLM having a small field of view, as for example according to FIG. 9. In particular, the virtual visibility region VW lies in a plane, the observer plane BE, parallel to the SLM.

FIG. 11b shows the same SLM or display with the same position of the observer as in FIG. 11a, but now for the case in which the eye pupil of the eye or the head of the observer moves or rotates in order to observe an object point P2 in the outer region or in the edge region of the field of view. Rotation of the eye pupil of the observer's eye may for example be detected with a camera, so that gaze tracking can be carried out.

The calculation of the hologram of the scene to be reconstructed or of an object may, however, alternatively also be carried out independently of the viewing direction and take into account only the lateral position and the distance of the eye with respect to the SLM so that an observer can observe the edge of the SLM or display from this position deliberately only with a rotated head or eye. In such a case, according to FIG. 11b, the encoding region for an object point P2 may be calculated as if there were a virtual visibility region $VW_{new}$ tilted relative to the SLM in such a way that the virtual visibility region $VW_{new}$ is perpendicular to the connecting line of its middle through P2 to the SLM. This leads to a different size of the subhologram $SH_2$, or also of the encoding region generated therefrom on the SLM, than would be the case when calculating a subhologram or encoding region from a virtual visibility region $VW_{standard}$ which is parallel to the SLM. This modified size and position of the subhologram and of the encoding region generated therefrom achieves an improved visible reconstruction of the object point P2 for the observer's eye.

Furthermore, in a refined configuration of this exemplary embodiment, it is possible for the calculation of encoding regions on the SLM to be carried out with continuous rotation of the virtual visibility region over the field of view or the region of view.

As an alternative, in another configuration of the exemplary embodiment according to FIG. 11b for rotation of the virtual visibility region VW only large angles of the field of view, for example angles of more than 30 degrees, are taken into account. Alternatively, the field of view may be divided into angle sections, a calculation with a virtual visibility region which is fixed inside the angle section, but optionally tilted, respectively being carried out for these angle sections.

Figure 12:
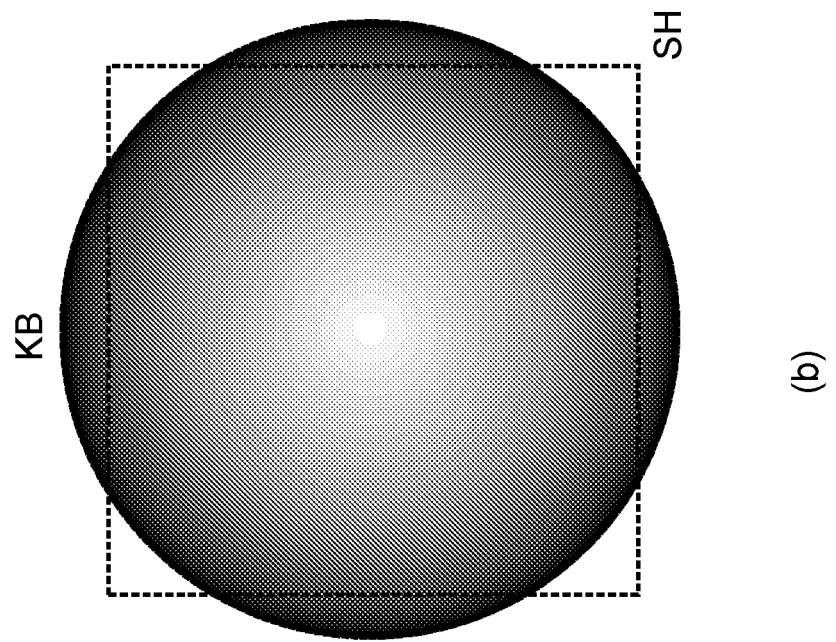
FIG. 12: shows a graphical representation of an apodized amplitude profile in an encoding region.
Figure 12:
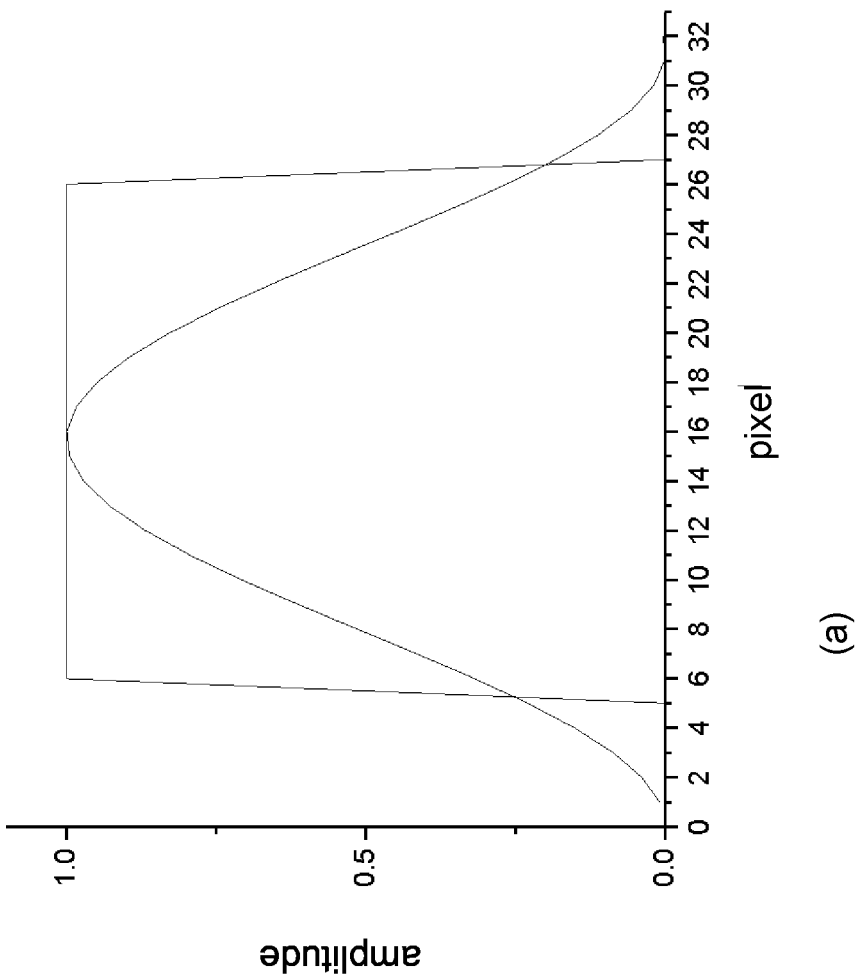

FIG. 12 shows in representation a) a subhologram having a rectangular amplitude profile. This means that the amplitude profile has a constant value inside the subhologram and a value of zero outside the subhologram.

In comparison therewith, an encoding region having an amplitude profile apodized in a sine-squared shape is likewise shown in representation a). In addition, this encoding region is selected here to be slightly larger than the size of the subhologram. The invention is not, however, restricted thereto. This means that the encoding region may also be equal to or smaller than the subhologram, as already described in relation to FIGS. 7 and 8. Instead of a sine-squared-shaped amplitude profile, it is however also possible to use other functions, for example a Gaussian function, in order to generate an apodized amplitude profile.

FIG. 12 shows in representation b) an apodized amplitude profile in an encoding region in conjunction with a subhologram. The use of an apodized amplitude profile may also be combined with a change in the shape of the encoding region in comparison with the subhologram, as shown by way of example in FIG. 8. Thus, for example, for a round or circular encoding region, a radial amplitude profile may also advantageously be used, i.e. an amplitude decreasing radially toward the edge with the distance with respect to the middle of the encoding region in all directions.

Representation b) of FIG. 12 schematically shows for illustration a square subhologram SH, which is shown by means of the dashed line, and in comparison therewith a round encoding region KB with an amplitude constantly decreasing radially from its middle.

In a similar way, encoding regions having an amplitude decreasing elliptically toward the edge region may also be used for rectangularly configured subholograms.

Advantages of the Fourier transform method for calculating and generating subholograms and of the projection method for direct subhologram calculation may therefore be combined according to the invention, if such a combination is advantageous for calculation and generation of a hologram on an SLM for a scene or object to be reconstructed.

The invention is not restricted to the exemplary embodiments represented here. In conclusion, it should yet particularly be pointed out that the exemplary embodiments described above merely serve to describe the teaching claimed, but do not restrict it to the exemplary embodiments.

The invention claimed is:
1. A method for generating holograms for encoding in a spatial light modulation device for a holographic display for representing a two- and/or three-dimensional scene, comprising:
    decomposing the scene into object points and encoding in a hologram, which is subdivided into subholograms, in the spatial light modulation device,
    encoding object points into encoding regions on the spatial light modulation device, and
    selecting a size and/or shape of an encoding region different than a size and/or shape of a subhologram, assigned to said encoding region in such a way that crosstalk of higher diffraction orders in a virtual visibility region is reduced.

2. The method as claimed in claim 1, wherein the value of the amplitude in the encoding region for the object point is reduced continuously toward the edge region of the encoding region.

3. The method as claimed in claim 1, wherein in the case of a field of view SF≥30 degrees, a virtual visibility region, which is formed parallel to the spatial light modulation device, is calculated for a central region of the spatial light modulation device, where a virtual visibility region, which is formed at an angle to the spatial light modulation device, corresponding to an angle at which an observer looks at the spatial light modulation device, being calculated for edge regions of the spatial light modulation device.

4. The method as claimed in claim 1, wherein a subhologram is generated by means of a geometrical projection of a virtual visibility region in an observer plane through an object point onto the spatial light modulation device.

5. The method as claimed in claim 4, wherein, after the geometrical projection of the virtual visibility region onto the spatial light modulation device,
    setting the amplitude in the subhologram generated to a constant value for all pixels of the subhologram,
    respectively reducing the value of the amplitude continuously by a predefined value for pixels present in the edge region of the subhologram, and
    increasing the subhologram in its extent by pixels in order to generate the encoding region for the object point, the value of the amplitude of these pixels being further reduced continuously up to a threshold value.

6. The method as claimed in claim 5, wherein a value of 1% of the maximum amplitude in the encoding region is selected for the threshold value.

7. The method as claimed in claim 5, wherein a bell-shaped amplitude profile is generated in the encoding region.

8. The method as claimed in claim 4, wherein, after the geometrical projection of the virtual visibility region onto the spatial light modulation device,
    reducing the subhologram in its extent by pixels in order to generate the encoding region for the object point,
    setting the amplitude in the encoding region generated to a constant value for all pixels of the encoding region, and
    respectively reducing the value of the amplitude continuously by a predefined value up to a threshold value for pixels present in the edge region of the encoding region.

9. The method as claimed in claim 8, wherein a value of 1% of the maximum amplitude in the encoding region is selected for the threshold value.

10. The method as claimed in claim 8, wherein a bell-shaped amplitude profile is generated in the encoding region.

11. The method as claimed in claim 1, wherein an apodization function is encoded into the encoding region for the object point in the spatial light modulation device, or calculated values of the encoding region for the object point are multiplied by an apodization function, the apodization function having a maximum amplitude value in the central region of the encoding region and decreasing to a value of 0 toward the edge region of the encoding region.

12. The method as claimed in claim 1, wherein an encoding region is respectively calculated once by means of a Fourier transform for an object point at a particular depth with respect to the spatial light modulation device, the amplitude profile of the calculated subhologram being stored in a look-up table.

13. The method as claimed in claim 1, wherein an encoding region is calculated once by means of a wave propagation method other than a Fourier transform, for an object point at different depths and in different lateral positions with respect to the spatial light modulation device, the amplitude profile of the calculated encoding region being stored in a look-up table.

14. The method as claimed in claim 1, wherein the amplitude profile is respectively stored in a look-up table only for object points having a reference intensity A, while for an object point which has an intensity B and is located at an equal depth with respect to the spatial light modulation device as an object point having an intensity A, the amplitude profile for the individual pixels of the associated encoding region is taken from the look-up table and the amplitudes for each pixel are multiplied by a factor $(B/A)^2$.

15. The method as claimed in claim 1, wherein, in the case of a small distance of the object point with respect to the spatial light modulation device and/or in the case of a large angle of the object point with respect to the virtual visibility region, the encoding region is determined from a subhologram which is calculated with a Fourier transform method and/or by means of Huygens' wavelets.

16. The method as claimed in claim 15, wherein the distance of the object point with respect to the spatial light modulation device is less than 5% of the observer distance with respect to the spatial light modulation device for a display with a size of a virtual visibility region of more than 10 mm, or is less than 10% of the observer distance with respect to the spatial light modulation device for a display with a size of a virtual visibility region of between 5 mm and 10 mm.

17. The method as claimed in claim 1, wherein, in the case of a large distance of the object point with respect to the spatial light modulation device and/or in the case of a small angle of the object point with respect to the virtual visibility region, the encoding region is determined from a subhologram which is calculated with a projection method, in which
    projecting the virtual visibility region through the object point onto the spatial light modulation device and generating a subhologram,
    allowing the subhologram to be extendible or reducible by pixels in order to generate the encoding region for the object point on the spatial light modulation device,
    encoding a phase function into the encoding region, and
    encoding an amplitude function into the encoding region in such a way that the object point is reconstructed with a predetermined intensity.

18. The method as claimed in claim 17, wherein the distance of the object point with respect to the spatial light modulation device is greater than or equal to 5% of the observer distance with respect to the spatial light modulation device for a display with a size of a virtual visibility region of more than 10 mm, or is greater than or equal to 10% of the observer distance with respect to the spatial light modulation device for a display with a size of a virtual visibility region of between 5 mm and 10 mm.

19. The method as claimed in claim 1, wherein a limiting subhologram size is determined, and where, for all object points whose subhologram sizes are greater than or equal to this limiting subhologram size, encoding regions are calculated from subholograms with the projection method, and for all object points whose subhologram sizes are less than this limiting subhologram size, encoding regions are calculated from subholograms with the Fourier transform method or with based on a look-up table.

20. The method as claimed in claim 19, wherein a value of 5 pixels is selected for the limiting subhologram size.

21. The method as claimed in claim 1, wherein those object points for which encoding regions and subholograms are calculated according to a projection method and those object points for which encoding regions and subholograms are calculated according to a wave propagation method are determined by a detected distance or a lateral position of an observer or a viewing angle of the observer at the spatial light modulation device.

22. The method as claimed in claim 1, wherein the extent of the virtual visibility region is selected to be less than or equal to the extent of a diffraction order, particularly where, in the case of a color reconstruction of the scene, the virtual visibility region is adapted in its extent to an extent of a diffraction order for the shortest wavelength used.

23. The method as claimed in claim 1, wherein, for calculation of the amplitude profile for the encoding region, transformation of the light propagation from the object point in an object plane into a complete diffraction order in the observer plane is carried out, amplitudes then being set to a value of 0 in an edge section of the diffraction order in the observer plane in order to generate a virtual visibility region which is reduced in its size in the observer plane.

24. The method as claimed in claim 23, wherein the calculated values for the amplitudes in the diffraction order in the observer plane are multiplied by an apodization function, the extent of which is less than one diffraction order.

25. The method as claimed in claim 24, wherein a rectangle function, a Gaussian function or a cosine function is used as the apodization function.

26. A light modulation apparatus into which a hologram is encoded according to the method as claimed in claim 1.

27. A display representing a two- and/or three-dimensional scene, comprising at least one spatial light modulation device into which a hologram is encoded according to the method as claimed in claim 1.

* * * * *